United States Patent
Moreland et al.

(10) Patent No.: US 9,741,195 B2
(45) Date of Patent: Aug. 22, 2017

(54) SYSTEMS AND METHODS FOR FACILITATING COIN HOPPER MAINTENANCE

(71) Applicant: TIDEL ENGINEERING L.P., Carrollton, TX (US)

(72) Inventors: Flynt Moreland, Plano, TX (US); Doug Powers, Keller, TX (US); Troy Richard, Plano, TX (US); Monte Needham, Argyle, TX (US)

(73) Assignee: TIDEL ENGINEERING, L.P., Chicago, IL (US)

( * ) Notice: Subject to any disclaimer, the term of this patent is extended or adjusted under 35 U.S.C. 154(b) by 0 days.

(21) Appl. No.: 14/842,620

(22) Filed: Sep. 1, 2015

(65) Prior Publication Data

US 2016/0300421 A1   Oct. 13, 2016

Related U.S. Application Data

(60) Provisional application No. 62/146,885, filed on Apr. 13, 2015.

(51) Int. Cl.
| | |
|---|---|
| *G07D 1/00* | (2006.01) |
| *G07D 9/00* | (2006.01) |
| *B65D 83/04* | (2006.01) |
| *B65D 90/58* | (2006.01) |
| *G06Q 10/00* | (2012.01) |

(52) U.S. Cl.
CPC ............ *G07D 9/002* (2013.01); *B65D 83/04* (2013.01); *B65D 90/58* (2013.01); *G06Q 10/20* (2013.01); *G07D 9/008* (2013.01)

(58) Field of Classification Search
CPC .... G07D 1/00; G07D 11/0003; G07D 11/009; G07D 13/00; G07D 2201/00; G07D 9/002; G07D 9/008; B65D 83/00; B65D 83/04; B65D 90/58
USPC ........................................................ 453/18
See application file for complete search history.

(56) References Cited

U.S. PATENT DOCUMENTS

| | | | | |
|---|---|---|---|---|
| 5,161,736 | A * | 11/1992 | Roccoberton | G07D 11/0009 232/15 |
| 5,531,640 | A | 7/1996 | Inoue | |
| 5,850,966 | A * | 12/1998 | Siler | G07F 9/06 109/46 |
| 6,569,006 | B1 | 5/2003 | Kurosawa | |
| 8,959,963 | B2 * | 2/2015 | Stoll | B65D 55/02 206/1.5 |
| 2001/0055999 | A1 | 12/2001 | Bush | |

(Continued)

OTHER PUBLICATIONS

Nonfinal Office Action in U.S. Appl. No. 14/842:596 dated Jun. 3, 2016, (12 pages).

*Primary Examiner* — Mark Beauchaine
(74) *Attorney, Agent, or Firm* — Polsinelli PC

(57) ABSTRACT

Implementations described and claimed herein involve systems and methods for facilitating coin hopper maintenance. In one implementation, a top plate is received in a bucket assembly of the coin hopper at a proximal end. The top plate seals one or more coins in an interior of the bucket assembly. The coin hopper is positioned in an inverted orientation by meeting a target surface with the top plate. The inverted orientation positions the bucket assembly at a distal end near the target surface and a base assembly at the proximal end. A hopper dispenser is disengaged from the base assembly of the coin hopper.

19 Claims, 23 Drawing Sheets

(56) References Cited

U.S. PATENT DOCUMENTS

| | | |
|---|---|---|
| 2003/0234153 A1 | 12/2003 | Blake |
| 2004/0072528 A1 | 4/2004 | Kurosawa |
| 2005/0197054 A1 | 9/2005 | Deitz |
| 2007/0187897 A1 | 8/2007 | Dilling |
| 2010/0210379 A1 | 8/2010 | Shelley |
| 2010/0234985 A1 | 9/2010 | Shuren |
| 2011/0117827 A1* | 5/2011 | Chang ............... G07D 1/00 453/57 |
| 2011/0130225 A1 | 6/2011 | Sims |
| 2016/0189462 A1 | 6/2016 | Powers |

* cited by examiner

SYSTEMS AND METHODS FOR FACILITATING COIN HOPPER MAINTENANCE

CROSS-REFERENCE TO RELATED APPLICATIONS

The present application claims benefit under 35 U.S.C. §119(e) to U.S. Provisional Patent Application No. 62/146,885, entitled "SYSTEMS AND METHODS FOR FACILITATING COIN HOPPER MAINTENANCE" and filed on Apr. 13, 2015, which is specifically incorporated by reference herein in its entirety.

TECHNICAL FIELD

Aspects of the present disclosure relate to coin payout systems and methods and more particularly to facilitating coin hopper maintenance, including jam clearance and addressing other service issues.

BACKGROUND

Gaming, vending, amusement, industrial, and retail industries, among others, often utilize coin hoppers to provide coin counter and payout systems. Performing maintenance for such coin hoppers is generally cumbersome. For example, coin hoppers periodically jam or become afflicted by other service issues. Coin jams may result from bent coins, the introduction of coins with the wrong denomination, foreign objects lodged in the coin hopper, and/or the like. Conventionally, addressing a coin jam or other service issues involves removing the coins from the coin hopper prior to addressing the issue, which is often a tedious and time consuming task. These challenges are further exacerbated where the coin hopper is configured to handle a high capacity of coins. Removing the coins from an increased capacity coin hopper is a particularly arduous task due to the high weight of the coins, as well as the baffles, partitions, and other components positioned inside a cup of the coin hopper to control a flow of the coins into the coin dispenser. It is with these observations in mind, among others, that various aspects of the present disclosure were conceived and developed.

SUMMARY

Implementations described and claimed herein address the foregoing problems by providing systems and methods for facilitating coin hopper maintenance. In one implementation, a coin hopper includes a bucket assembly and a top plate. The bucket assembly has a proximal edge defining an opening through which one or more coins are receivable. At least one channel is disposed at the proximal edge. The top plate is receiveable into the at least one channel to seal the opening and is adapted to contact a target surface.

In another implementation, a coin hopper includes a body extending longitudinally from a stopper to an edge and transversely between a pair of opposing side edges along a plane. At least one surface forms the stopper. The at least one surface is oriented at an angle relative to the plane. The body is engagable to a bucket assembly to seal an opening to a bucket interior housing one or more coins.

In still another implementation, a top plate is received in a bucket assembly of the coin hopper at a proximal end. The top plate seals one or more coins in an interior of the bucket assembly. The coin hopper is positioned in an inverted orientation by meeting a target surface with the top plate. The inverted orientation positions the bucket assembly at a distal end near the target surface and a base assembly at the proximal end. A hopper dispenser is disengaged from the base assembly of the coin hopper.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for facilitating coin hopper maintenance. To perform maintenance, such as addressing a coin jam or other service issues, in one aspect, a coin hopper is positioned on a surface, and a top plate is positioned for insertion at a proximal end of a bucket assembly of the coin hopper. Coins are sealed in an interior of the bucket assembly by inserting the top plate into the proximal end. The coin hopper is positioned in an inverted orientation with the top plate disposed near the surface. A release pin is removed from a base assembly of the coin hopper, and a hopper dispenser is removed from the base assembly. A service issue corresponding to the hopper dispenser is addressed, and the coin hopper is reassembled and reoriented. Eliminating the need to remove the coins prior to performing maintenance significantly increases efficiency and reduces the effort exerted while servicing the coin hopper.

Figure 1:
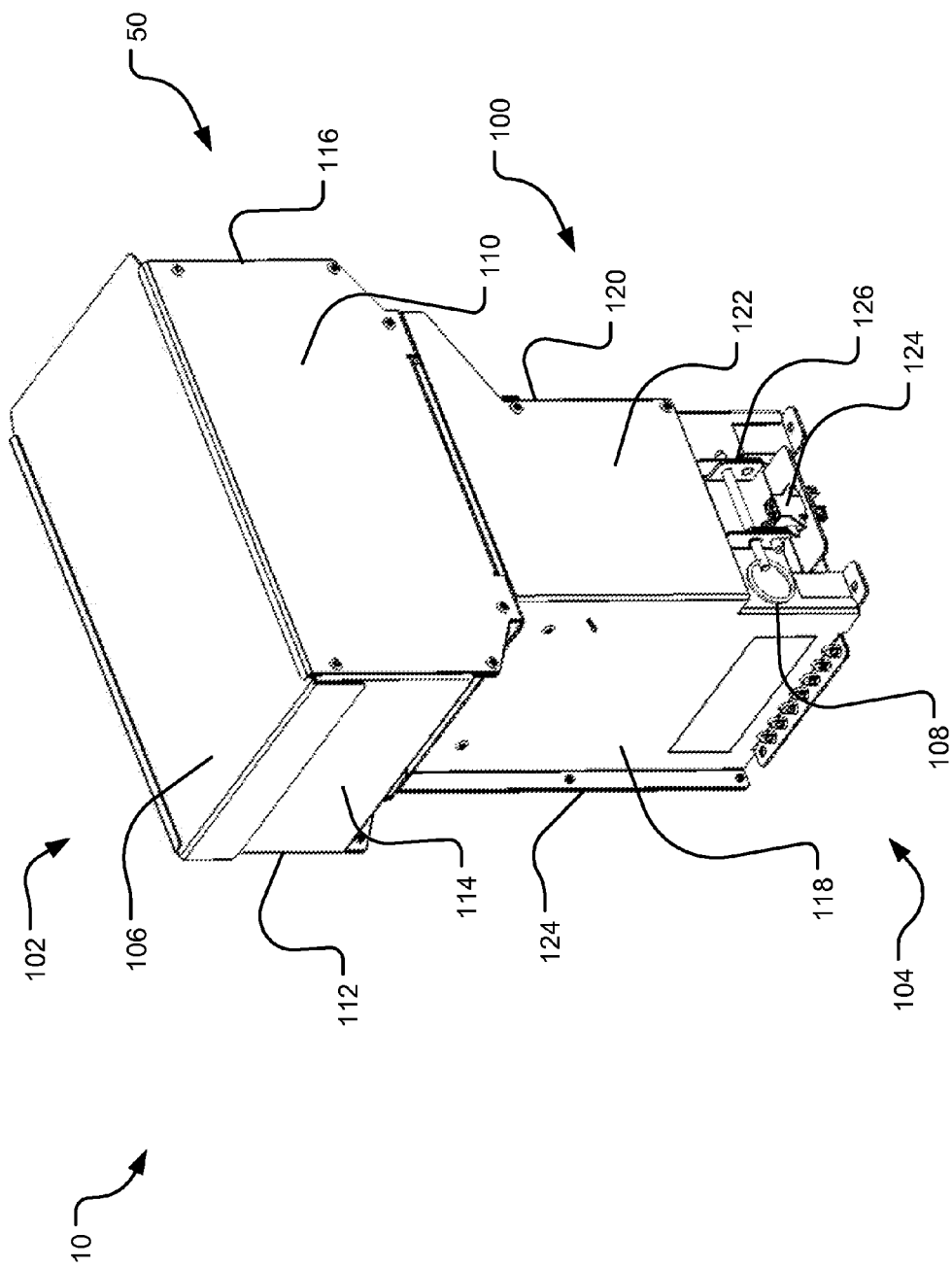
FIG. 1 is an isometric view of an example coin hopper configured to facilitate maintenance.
Figure 2:
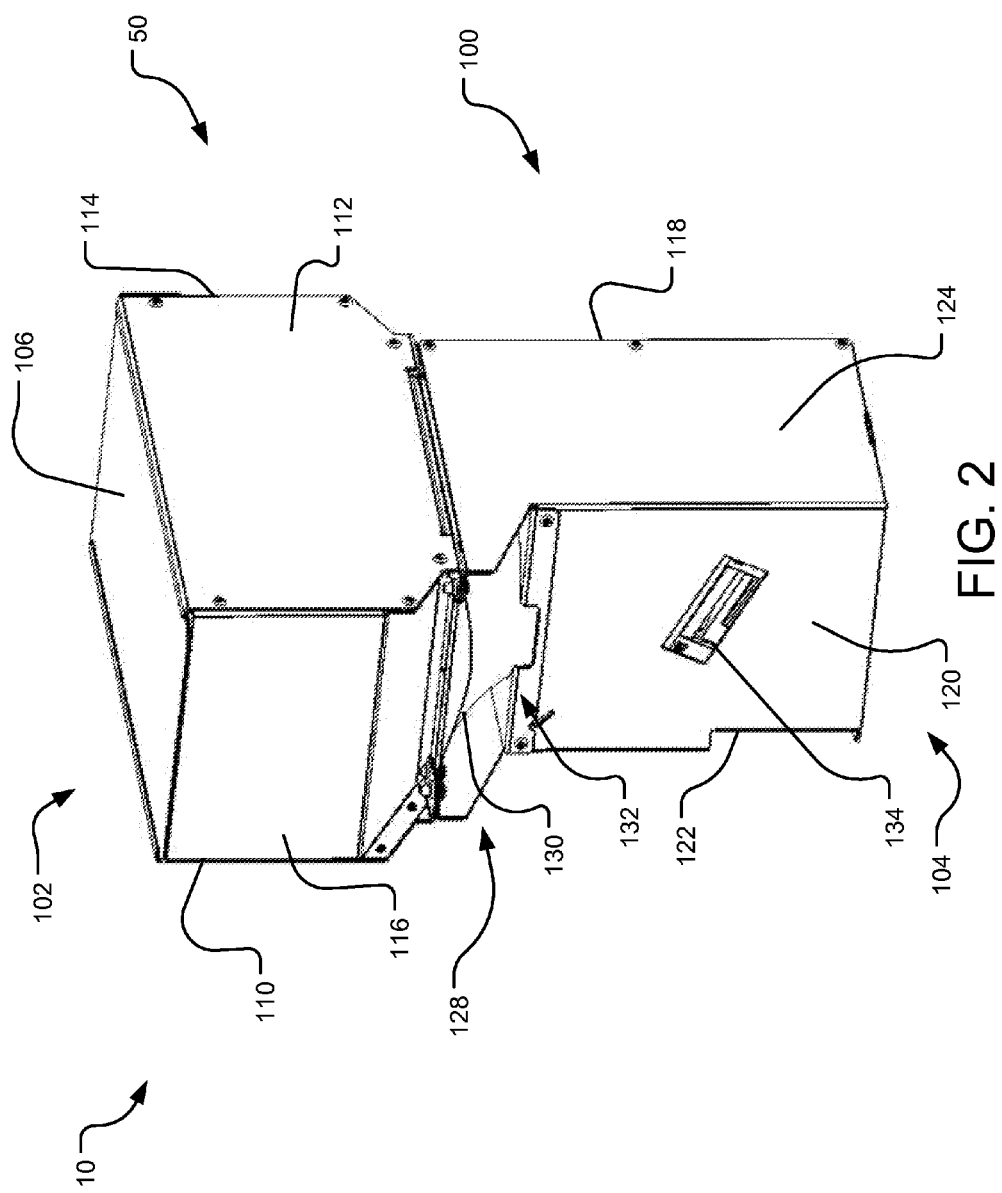
FIG. 2 is a perspective view of the coin hopper.

To begin a detailed description of an example coin hopper 10 configured to facilitate maintenance, reference is made to FIGS. 1-2. In one implementation, the coin hopper 10 includes a bucket assembly 50, a base assembly 100, a top plate 106, and a release pin 108. The bucket assembly 50 is disposed at a proximal end 102 of the coin hopper 10, and the base assembly 100 is disposed at a distal end 104 of the coin hopper 10.

In one implementation, the bucket assembly 50 includes a bucket configured to receive coins into an interior of the bucket. The bucket may be a variety of shapes and sizes, including, without limitation, cubical, hexahedral, spherical, cylindrical, conical, pyramidal, or other polyhedral shapes. In one implementation, the bucket is formed by side panels 110 and 112 connecting a front panel 116 to a back panel 114. The panels 110-116 may include generally planar, smooth surfaces. However, other surface shapes and textures are contemplated.

The base assembly 100 may be a variety of shapes and sizes, including, without limitation, cubical, hexahedral, spherical, cylindrical, conical, pyramidal, or other polyhedral shapes. In one implementation, the base assembly 100 includes a front panel 120, a back panel 118 disposed generally opposite the front panel 120, and a pair of opposing side panels 122 and 124. The panels 118-124 may include generally planar, smooth surfaces. However, other surface shapes and textures are contemplated. In one implementation, a portion of the side panels 122 and 124 extends past the front panel 120 creating an opening 128 to a funnel assembly 132 having a funnel 130. The funnel assembly 132 is disposed between the bucket assembly 50 and the base assembly 100 to direct coins received in the bucket assembly 50 into the base assembly 100 with a controlled flow for counting and payout. The coins are counted within the base assembly 100 using a hopper dispenser and directed to an exit shoot 134. Such operations of the coin hopper 10, among others, are powered and communicated using a connector 124 disposed in the base assembly 100.

Periodically, the hopper dispenser may experience a coin jam or other service issue needing maintenance. Coin jams may result from bent coins, the presence of coins with the wrong denomination, foreign objects lodged in the coin hopper 10, and/or the like. To facilitate maintenance, in one implementation, the bucket assembly 50 is configured to receive the top plate 106 to seal the coins in the interior of the bucket, as shown in FIG. 1. Once the coins are sealed within the bucket assembly 50, the coin hopper 10 may be maneuvered or otherwise positioned, as needed, to perform maintenance. For example, to perform maintenance on the hopper dispenser, the coin hopper 10 may be positioned in an orientation (e.g., an inverted orientation) providing access to the hopper dispenser, which may be removed from the base assembly 100 by removing the release pin 108 from a receiver 126, as described herein.

Figure 3:
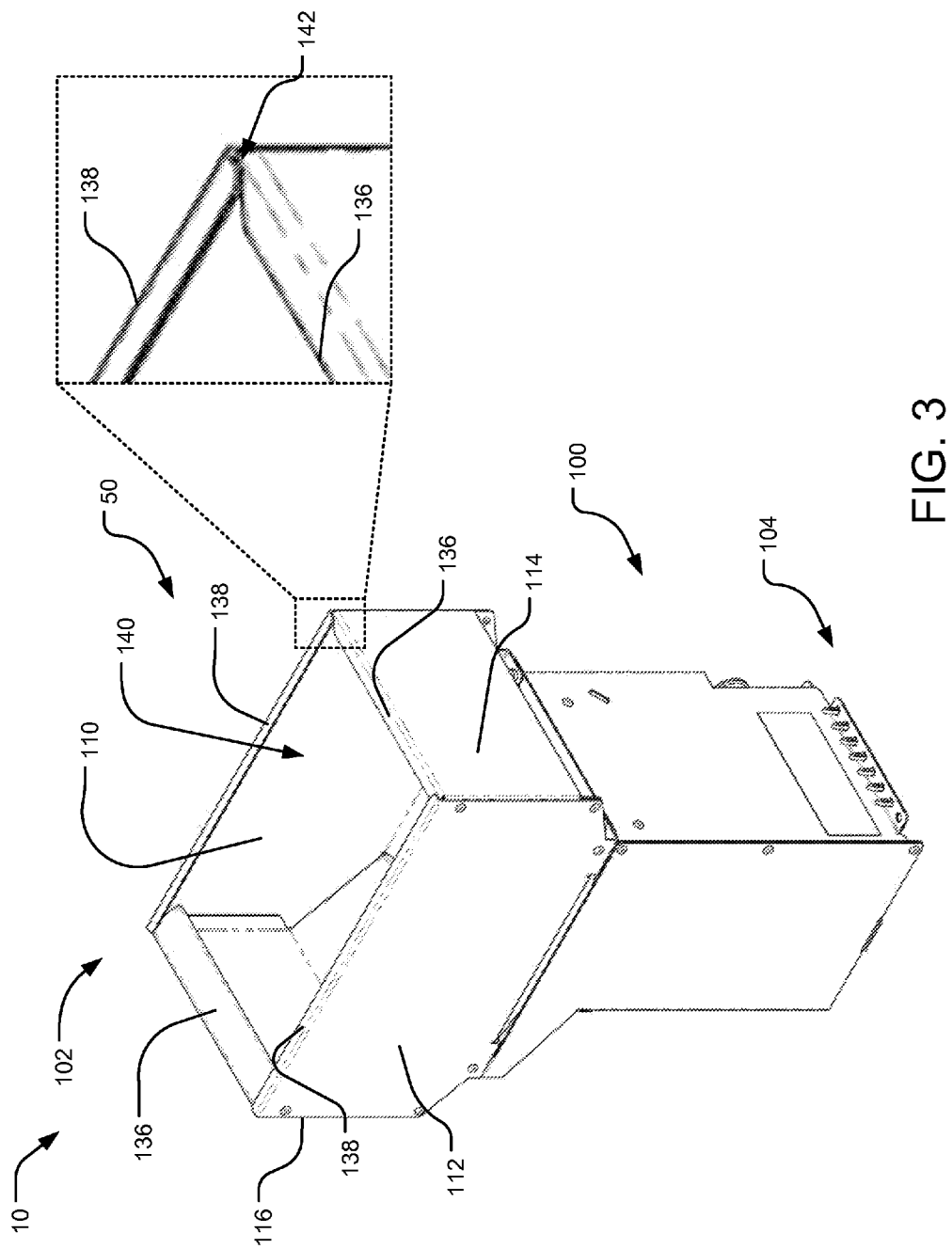
FIG. 3 shows the coin hopper with a top plate removed, including a detailed view of a channel adapted to receive the top plate.

As can be understood from FIG. 3, in one implementation, each of the panels 114 and 116 include a proximal end 136 extending inwardly towards a center of the bucket assembly 50 to form a lip. Similarly, the side panels 110-112 each include a proximal side end 138 extending inwardly towards a center of the bucket assembly 50 to form a lip. The ends 136 and the side ends 138 form a bucket opening 140 into the interior of the bucket assembly 50, and the lips of the ends 136 and the side ends 138 prevent spillage of coins as the coins are fed into the interior of the bucket assembly 50. The ends 136, in one implementation, are positioned proximal to the side ends 138 to form a channel 142 configured to receive the top plate 106 to seal the bucket opening 140 with coins in the interior of the bucket assembly 50.

Figure 4:
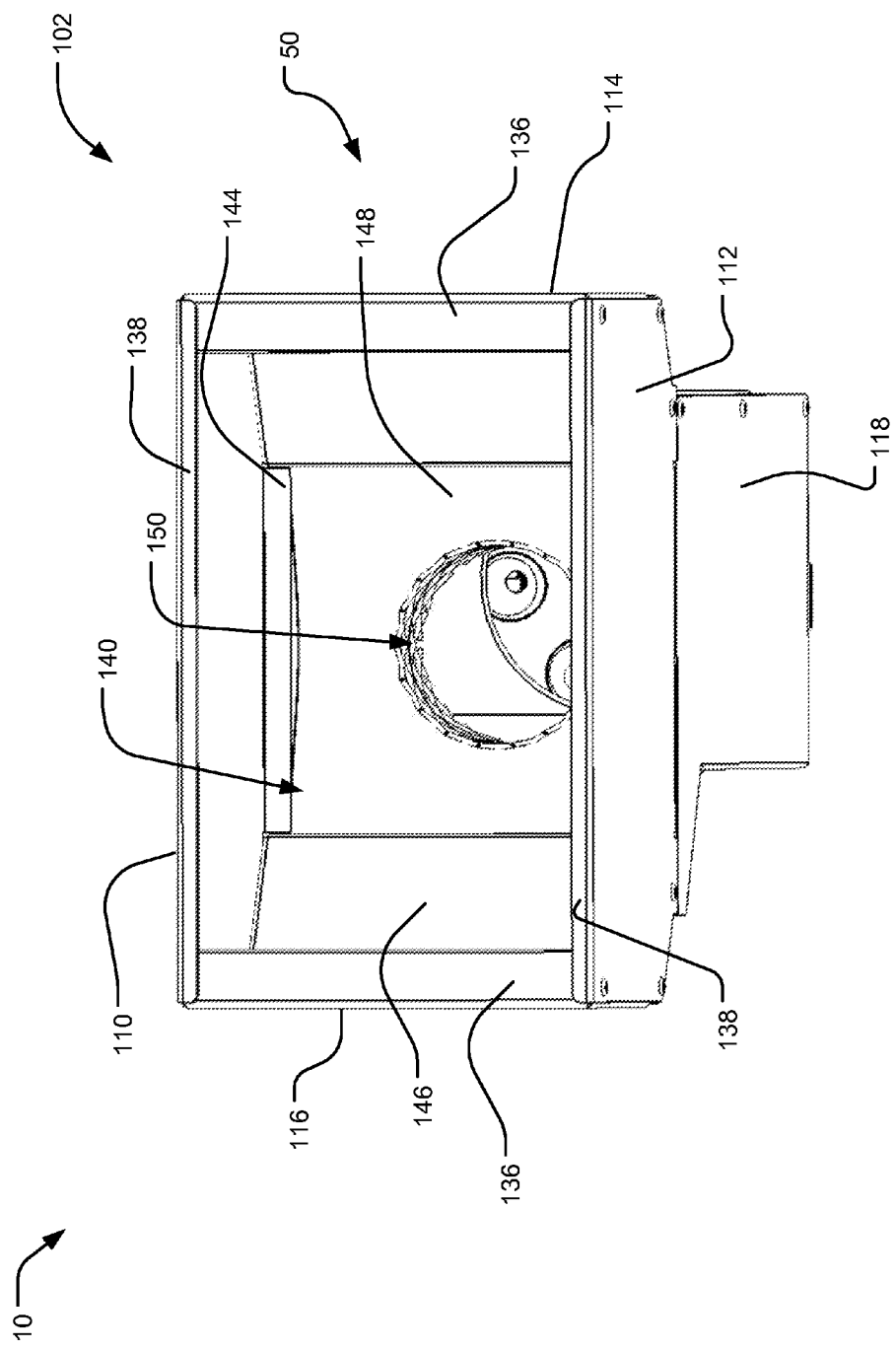
FIG. 4 illustrates a top view of the coin hopper with the top plate removed.

As can be understood from FIGS. 3-4, in one implementation, the bucket assembly 50 includes one or more interior surfaces 144-146. The interior surfaces 144-146 extend from one or more of the panels 110-116 at an angle configured to receive and direct coins into the funnel assembly 132 through a hole 150. In one implementation, the interior surfaces 144 extending from the side panels 110-112 have a shorter length relative to the interior surfaces 146 extending from the front panel 116 and the back panel 114. Similarly, the side ends 138 extending from the side panels 110-112 may have a shorter length relative to the ends 136 extending from the front panel 116 and the back panel 114.

In one implementation, the funnel 130 is mounted to the bucket assembly 50, such that the interior surfaces 144-146 transition into an inner surface 148 of the funnel 130 to direct the coins towards the hole 150 defined in the inner surface 148. The inner surface 148 may taper distally towards the hole 150 to release the coins into the base assembly 100 with a controlled flow for counting and payout.

Figure 5:
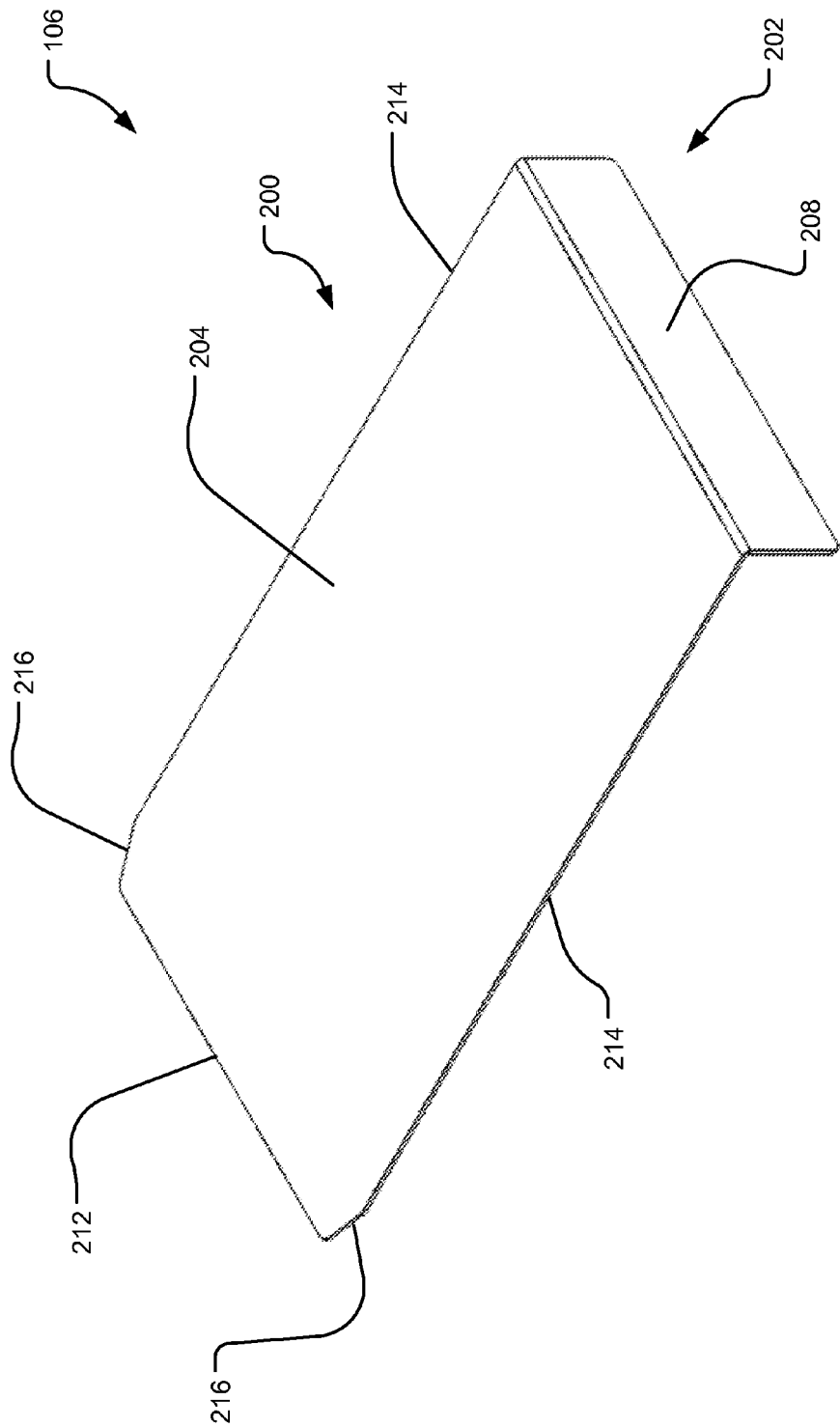
FIGS. 5 and 6 show top and bottom perspective views, respectively, of an example top plate for the coin hopper.
Figure 6:
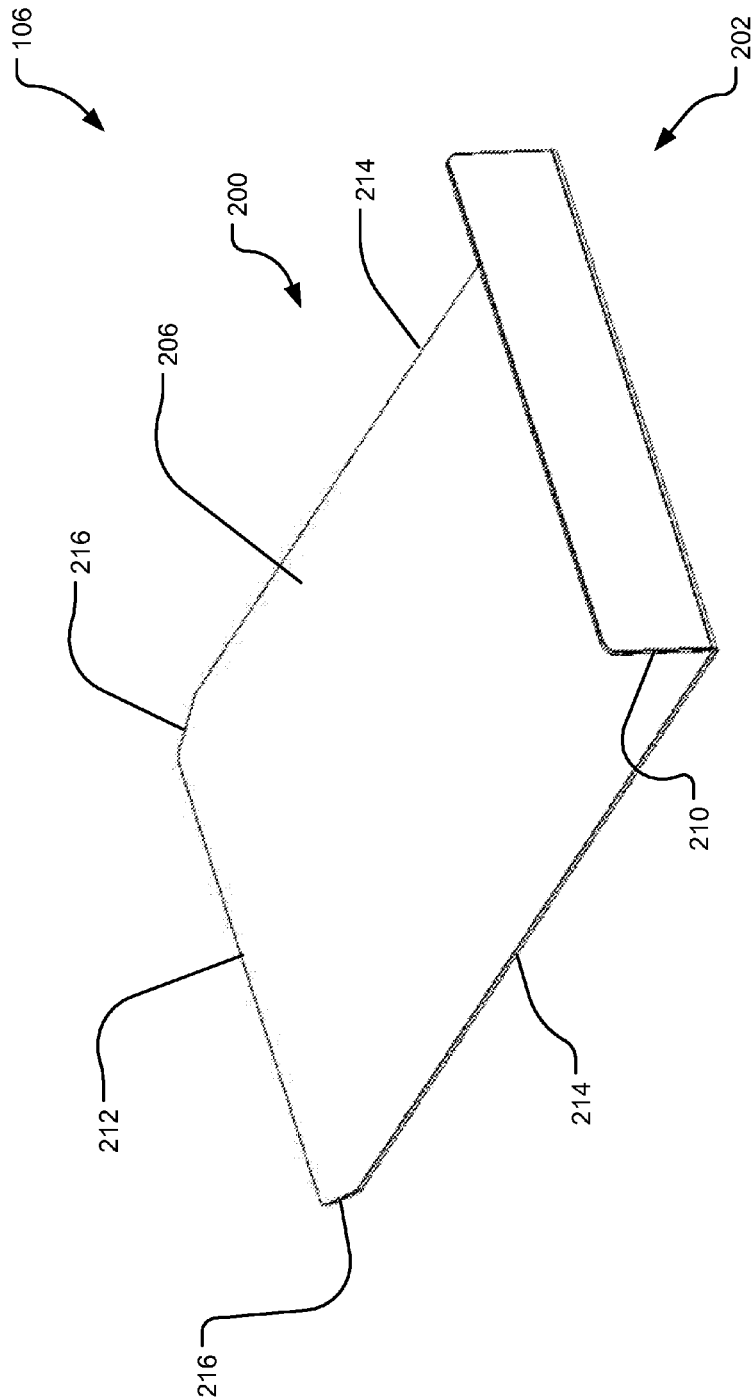

Turning to FIGS. 5-6, in one implementation, the top plate 106 includes a body 200 and a stopper 202. The body 200 is configured to cover the bucket opening 140, and the stopper 202 holds the body 200 in position over the bucket opening 140 to seal coins in the interior of the bucket assembly 50.

The top plate 106 may be made from a variety of materials, including, without limitation, metal, ceramic, plastic, and/or other robust materials adapted to seal the interior of the bucket assembly 50 and prevent the coins from spilling from the bucket assembly 50. For example, the top plate 106 may be made from zinc plated steel. Furthermore, the top plate 106 may be transparent to allow a user to see the coins on the interior of the bucket assembly 50 when sealed. However, other materials and/or aesthetic features are contemplated.

In one implementation, the body 200 includes a proximal surface 204 opposite a distal surface 206. The surfaces 204 and 206 each extend longitudinally from the stopper 202 to an edge 212 and transversely between a pair of opposing side edges 214. In one implementation, the surfaces 204 and 206 are generally planar, smooth surfaces. However, other surface shapes are contemplated, including, without limitation, angled, contoured, and/or textured. Similarly, the body 200 may have a variety of shapes and sizes adapted to mirror the shape and size of the opening of the bucket assembly 50. For example, the body 200 may be generally rectangular in shape. In an example implementation, the body 200 is: approximately 11 inches from the edge 212 to the stopper 202 and approximately 6 inches between the side edges 214. It will be appreciated that other shapes, including, but not limited to, circular, elliptical, triangular, polygonal, or the like, as well as other sizes, are contemplated. In one implementation, a width of the body 200 between the side edges 214 tapers towards the edge 212 to facilitate insertion of the top plate 106 into the channel 142 of the bucket assembly 50. For example, the body 200 may include cutouts 216 that taper inwardly from the side edges 214 to the edge 212.

The stopper 202 includes a first surface 208 positioned opposite a second surface 210. In one implementation, the surfaces 208 and 210 are oriented at an angle relative to the plane of the body 200. For example, the surfaces 208 and 210 may be perpendicular to the plane of the body 200. In one implementation, the surfaces 208 and 210 are generally planar, smooth surfaces. However, other surface shapes are contemplated, including, without limitation, angled, contoured, and/or textured. Similarly, the stopper 202 may have a variety of shapes and sizes adapted to mirror a surface of the bucket assembly 50 configured to receive the stopper 202. For example, the stopper 202 may be generally rectangular in shape. In an example implementation, the stopper 202 has a width of approximately 6 inches and a length of approximately 1.25 inches. It will be appreciated that other shapes, including, but not limited to, circular, elliptical, triangular, polygonal, or the like, as well as other sizes, are contemplated.

Figure 7:
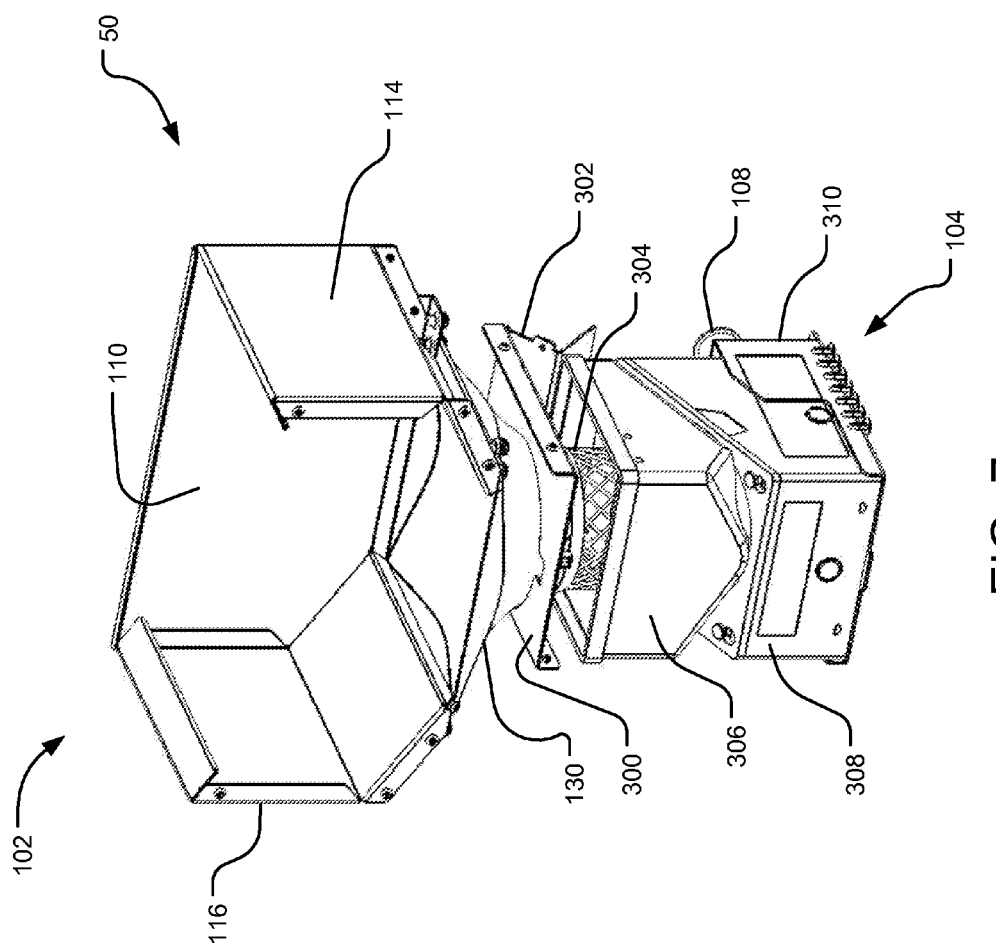
FIG. 7 is a perspective view of the coin hopper with a base assembly and a side panel remove to show internal components of the coin hopper.
Figure 8:
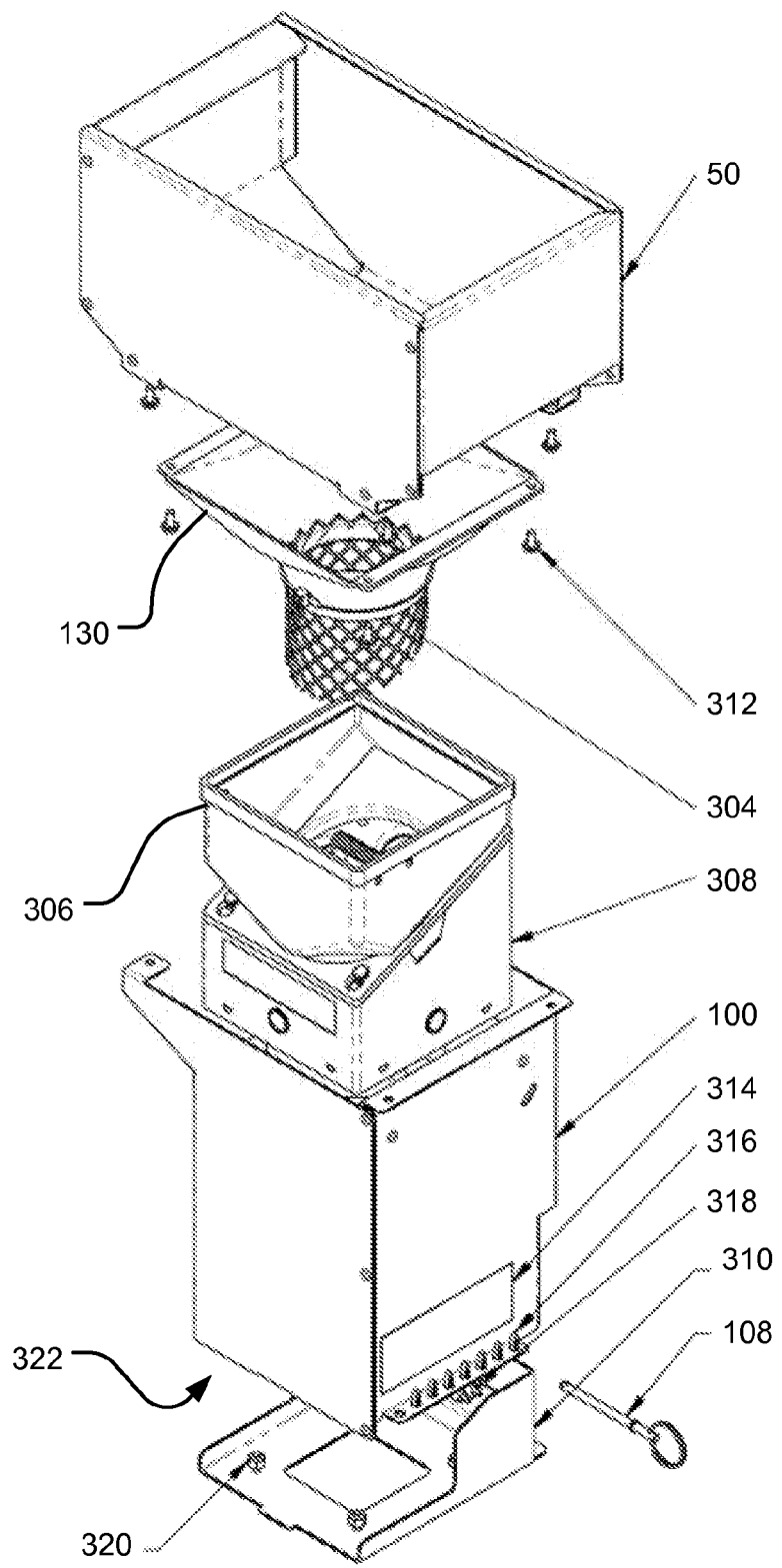
FIG. 8 is an exploded view of the coin hopper.

Turning to FIGS. 7-8, various example internal components of the coin hopper 10 are shown. In one implementation, a middle panel 300 extends around the funnel 130 and includes a side shield 302 having angled surfaces extending from the middle panel 300 to a cup 306 of a hopper dispenser 308. The middle panel 300 and the side shield 302 minimize spillage of coins from the cup 306.

To direct coins from the bucket assembly 50 into the cup 306 with a controlled flow, in one implementation, the coin hopper 10 includes the funnel 130, which may be secured to the bucket assembly 50 with one or more screws 312. The coins are released from the funnel 130 into the cup 306 of the hopper dispenser 308 for counting and payout. In one implementation, the funnel 130 is connected to a nozzle 304, which may be, for example, a netting made from a durable, flexible material, including, but not limited to, plastic, textile material, fabric, leather, and the like. The hopper dispenser 308 counts the coins and directs the coins to the exit shoot 134 for payout.

In one implementation, the base assembly 100 is configured to removably engage a hopper base 310, which is mounted to the hopper dispenser 308 using, for example, one or more nuts 320. As described herein, the release pin 108 may be removed, permitting the hopper base 310 and the hopper dispenser 308 to be removed from an interior 322 of the base assembly 100 to service the hopper dispenser 308. The base assembly 100 may include other features, such as a label window 314, one or more rivets 316, and a cable 318 of the power source 124.

Figure 9:
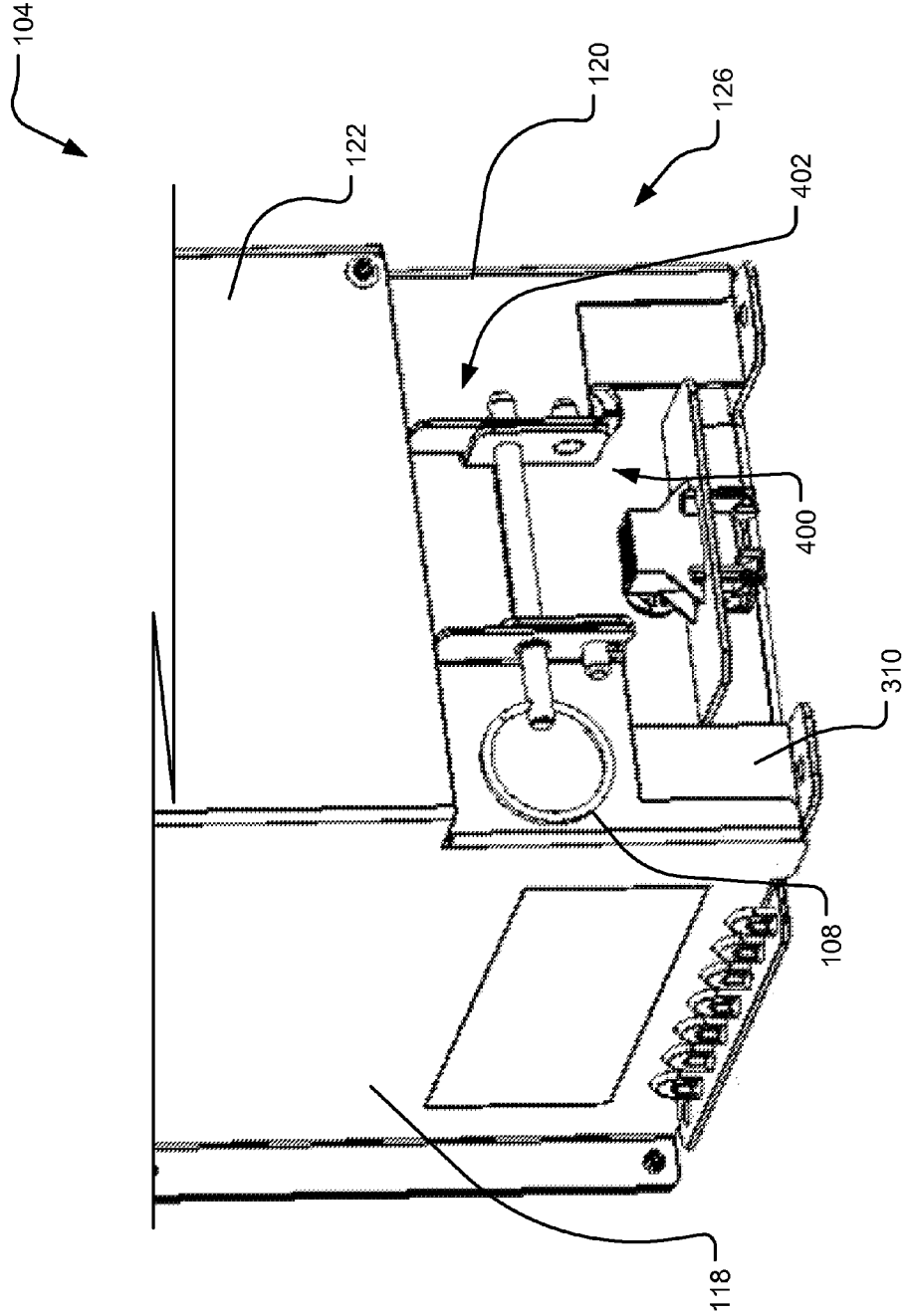
FIG. 9 is a detailed view of a release pin securing a hopper dispenser within the base assembly.

Turning to FIG. 9, in one implementation, the hopper dispenser 308 is secured within the interior 322 of the base assembly 100 by removably engaging the release pin 108 to the receiver 126. To remove the hopper dispenser 308 from the interior 322 of the base assembly 100 for maintenance, the release pin 108 is disengaged from the receiver 126. It will be appreciated, however, that the hopper dispenser 308 may be removably secured within the interior 322 in various manners, including, without limitation, a snap-fit connection, a friction connection, corresponding engaging features (male/female connectors), a sliding connection, a rotating connection, a magnetic connection, and/or other connections or engaging features.

In one implementation, the receiver 126 includes a hopper base receiver 400 and a base assembly receiver 402. The hopper base receiver 400 is disposed on the hopper base 310, and the base assembly receiver 402 is disposed on the hopper base assembly 100, for example, near the distal end 102 of the side panel 122. The release pin 108 engages the hopper base receiver 400 to the base assembly receiver 402 to removably engage the hopper base 310 to the base assembly 100, thereby releasably securing the hopper dispenser 308 in the interior 322 of the base assembly 100.

Figure 10:
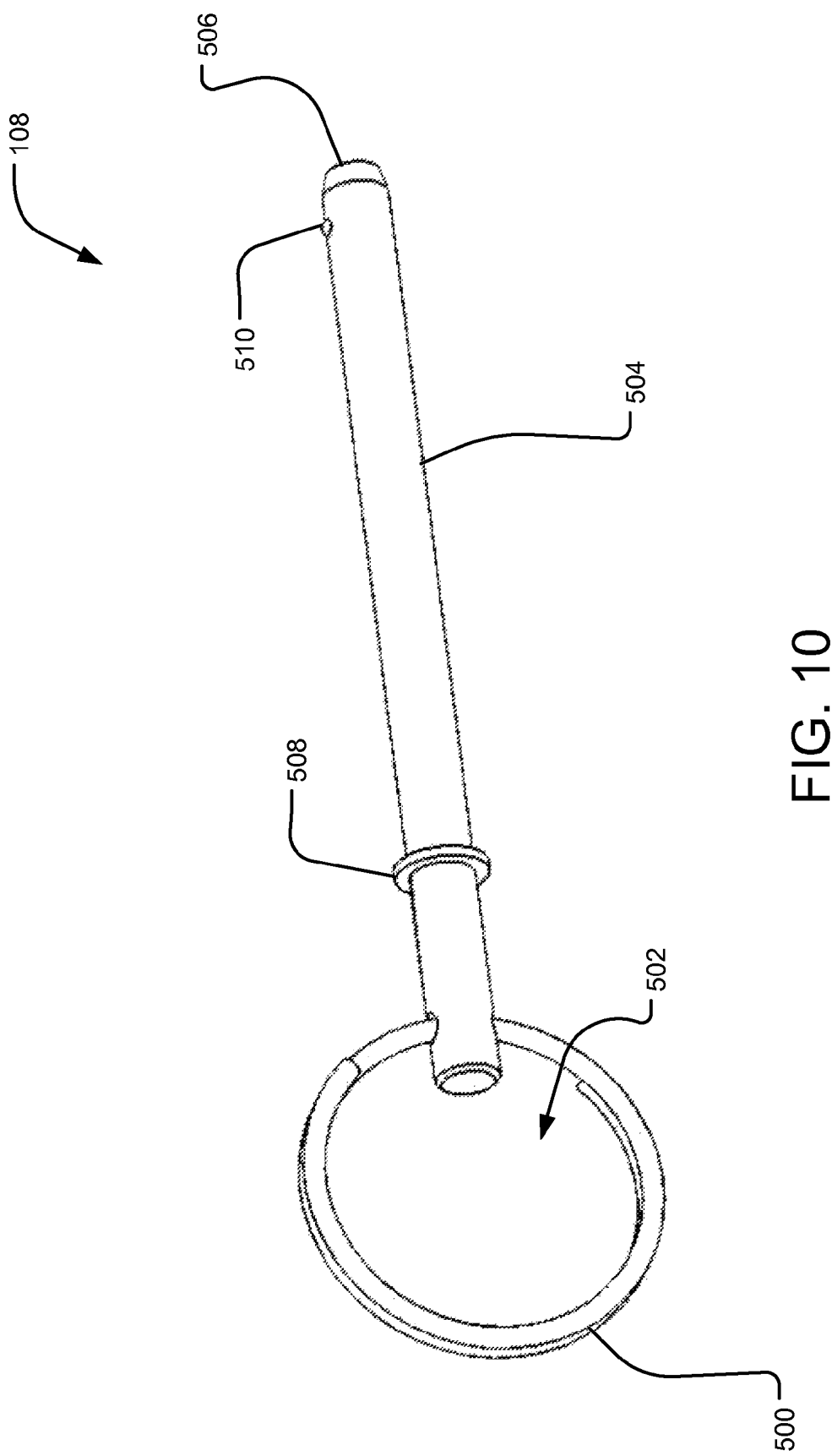
FIG. 10 is a perspective view of an example release pin.

As can be understood from FIG. 10, in one implementation, the release pin 108 includes an elongated body 504 extending from a grip 500 to an end 506. The grip 500 may be, for example, a ring having an opening 502 through which a user may insert one or more fingers to pull the release pin 108 from the base assembly 100 to disengage the hopper base 310. In one implementation, the elongated body 504 includes a stopper 508 and a stop bump 510 disposed thereon. The stopper 508 prevents the release pin 108 from extending too far through the receiver 126, and the stop bump 510 ensures that the release pin 108 is not inadvertently removed by providing an additional force needed to remove the release pin 108 from the receiver 126.

Figure 11:
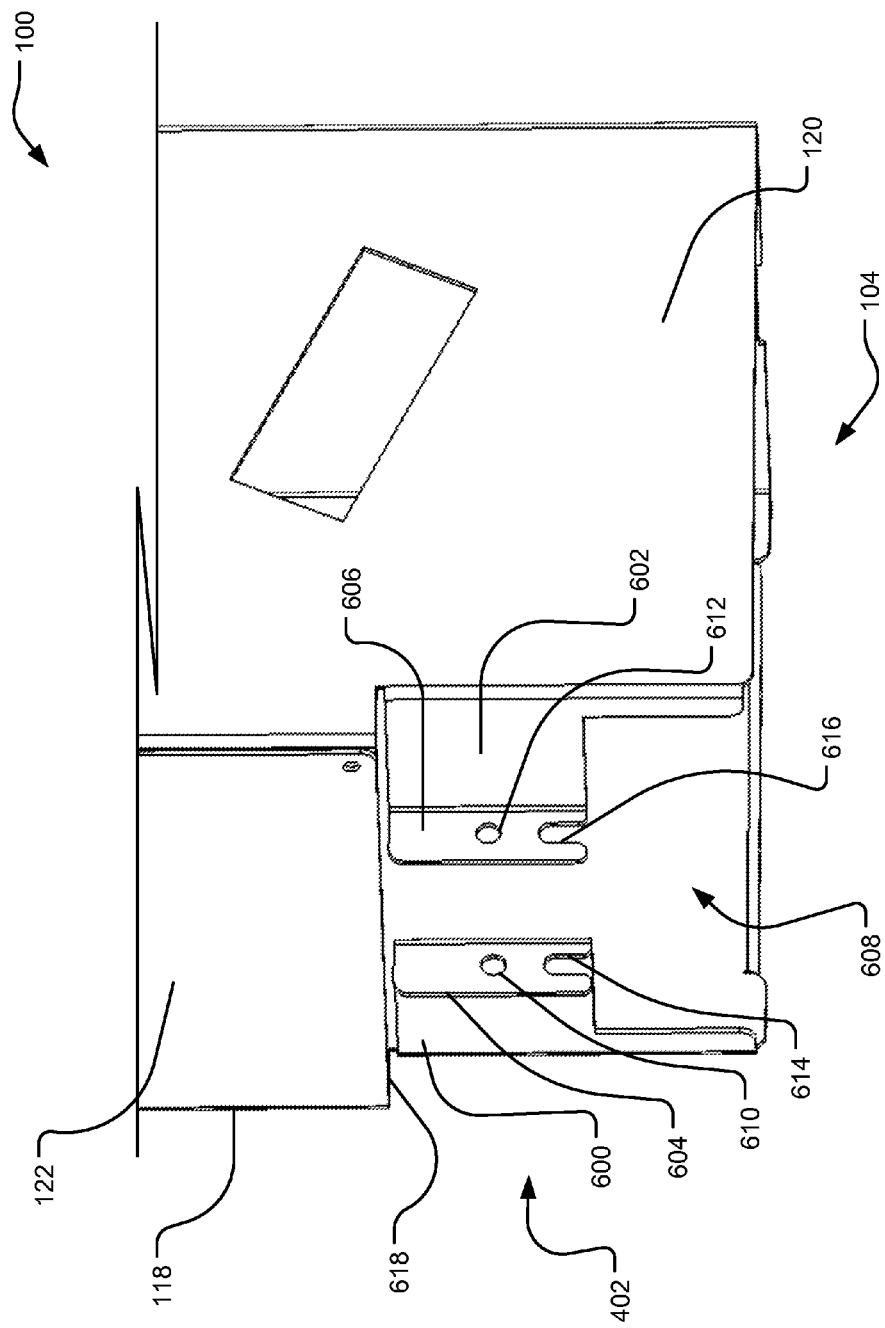
FIG. 11 is a detailed view of a securing portion of the base assembly.
Figure 12:
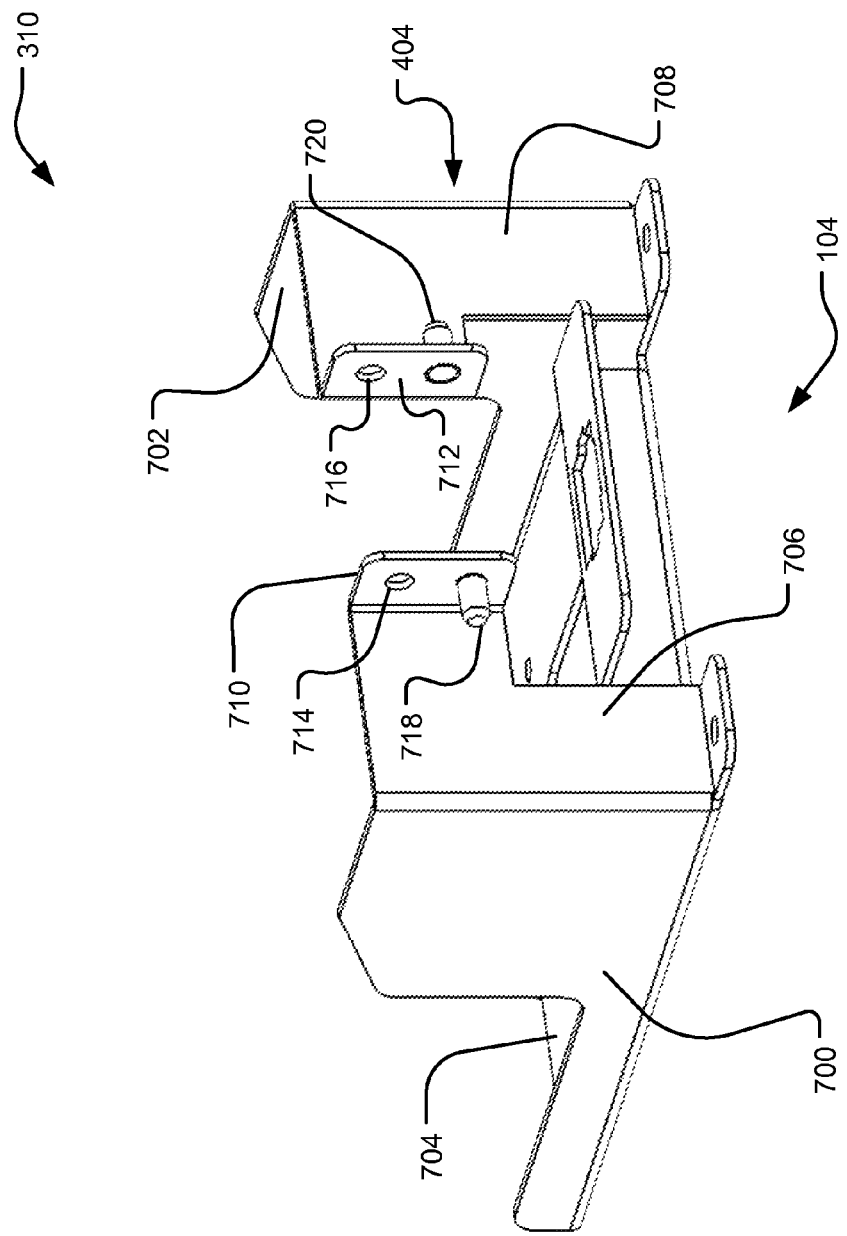
FIG. 12 illustrates a perspective view of an example hopper base.
Figure 13:
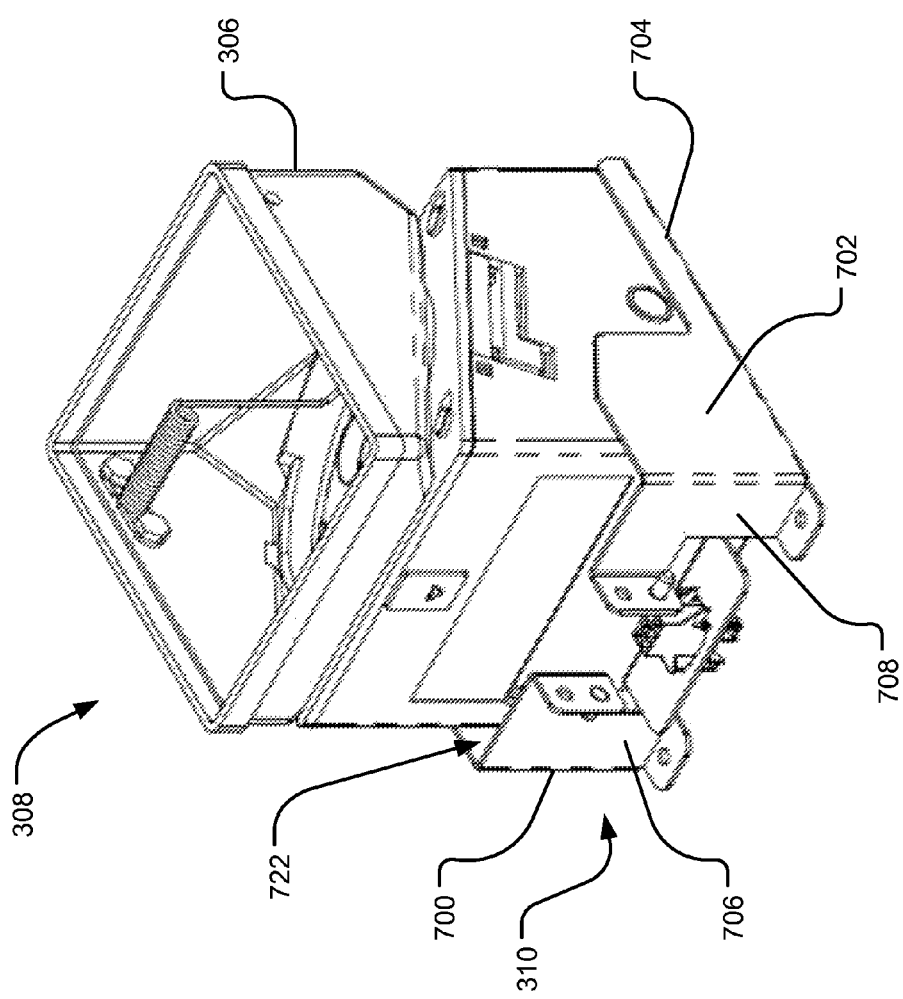
FIG. 13 is an isometric view of an example hopper dispenser mounted to the hopper base.

Turning to FIGS. 11-13, a detailed description of an example of the base assembly receiver 402 and the hopper base receiver 400 is provided. Referring first to FIG. 11, in one implementation, the base assembly 100 includes a shelf 618 indented from the side panel 122 and one or more walls 600 and 602 extending inwardly from the back panel 118 and the front panel 120, respectively, parallel to a length of the shelf 618. The walls 600 and 602, together with the shelf 618, define an opening 608 in the side panel 122.

Tabs 604 and 606 extend from the walls 600 and 602, respectively, to an edge formed by a length of the shelf 618. The tabs 604 and 606 may extend to the edge transverse to the length of the shelf such that surfaces of the tabs 604 and 606 are oriented parallel to each other with the opening 608 forming a gap therebetween. In one implementation, the tabs 604 and 606 include holes 610 and 612, respectively, to receive the elongated body 504 of the release pin 108 to engage the hopper base receiver 400. The tabs 604 and 606 may further include notches 614 and 616, respectively, to position and secure the hopper base 310 to the base assembly 100.

As can be understood from FIGS. 12-13, in one implementation, the hopper base 310 includes a frame formed by opposing panels 700 and 702 and a distal mount 704 extending therebetween. The distal mount 704 includes one or more features for mounting the hopper dispenser 308 to the hopper base 310.

In one implementation, the hopper base 310 includes one or more walls 706 and 708 extending inwardly from the panels 700 and 702, respectively. A pocket 722 may be formed between the walls 706 and 708 and the hopper dispenser 308 when the hopper dispenser 308 is mounted to the distal mount 704.

Tabs 710 and 712 extend from the walls 706 and 708, respectively, a length mirroring a length of the tabs 604 and 606 of the base assembly receiver 402. The tabs 604 and 606 may extend transverse to a length of the walls 706 and 708 such that surfaces of the tabs 710 and 712 are oriented parallel to each other with a gap therebetween. In one implementation, the tabs 710 and 712 include holes 714 and 716, respectively, to receive the elongated body 504 of the release pin 108 to engage the base assembly receiver 402.

The tabs 710 and 712 may further include pegs 718 and 720, respectively, to position and secure the hopper base 310 to the base assembly 100.

As discussed herein, the hopper base 310 may be mounted to the hopper dispenser 308. In one implementation, the hopper dispenser 308 is inserted proximally into the interior 322 of the base assembly 100 until a plane of the distal mount 704 is coplanar with a distal edge of the base assembly 100. Alternatively or additionally, the hopper dispenser 308 may be advanced proximally into the interior 322 of the base assembly 100 until the pegs 718 and 720 of the hopper base 310 engage the notches 614 and 616, respectively, of the base assembly 100.

In one implementation, when the hopper base 310 is positioned such that the hopper dispenser 308 is within the base assembly 100, the tabs 604 and 606 of the base assembly receiver 402 are adjacent with the tabs 710 and 712 of the base hopper receiver 400 with the holes 610, 612, 714, and 716 all aligned. To removably engage the hopper base 310 to the base assembly 100, securing the hopper dispenser 308 within the interior 322 of the base assembly 100, the release pin 108 is inserted through the holes 610, 612, 714, and 716. Thus, to remove the hopper dispenser 308 from the base assembly 100 for maintenance, the release pin 108 may be removed and the hopper base 310 displaced distally.

Figure 14:
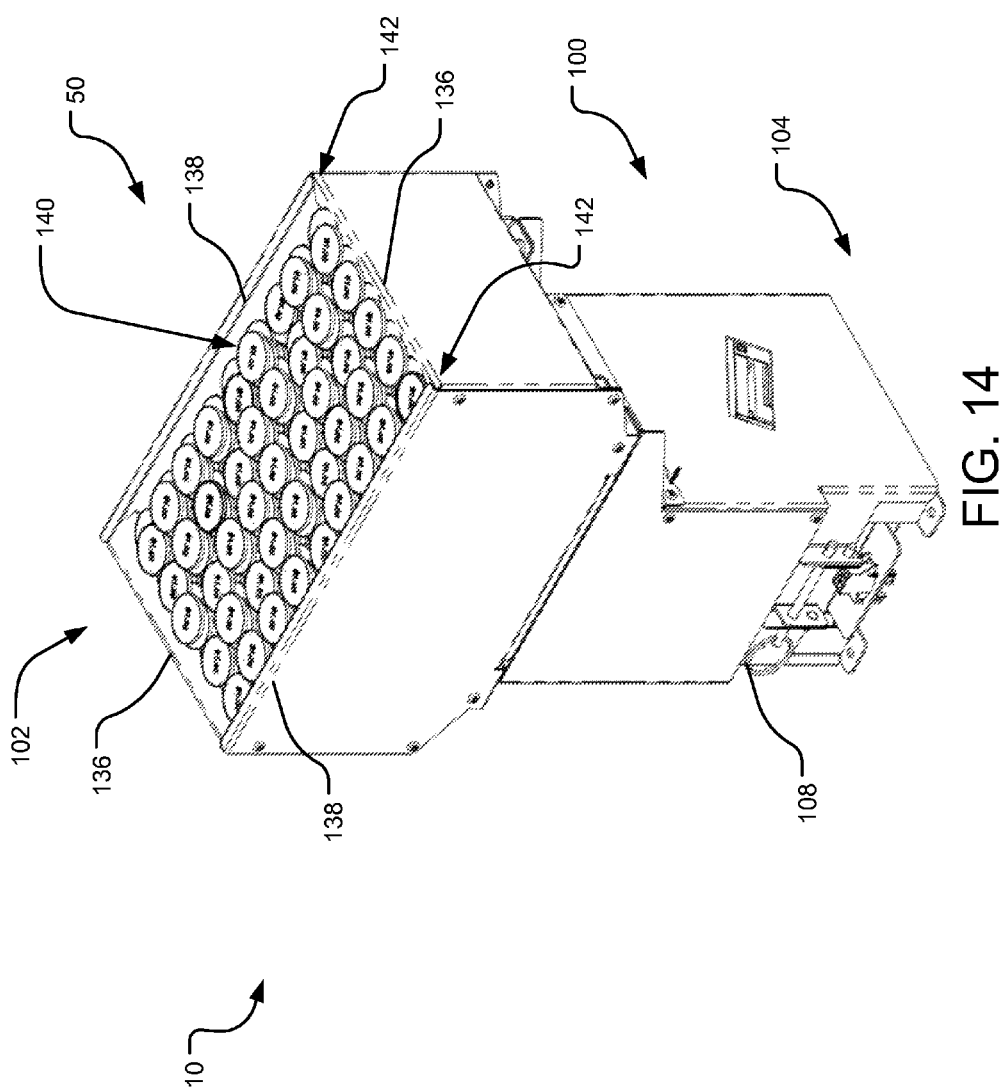
FIG. 14 illustrates the coin hopper with a bucket assembly full of coins.

Referring to FIGS. 14-22, an example description of maintenance of the coin hopper 10 is provided. As shown in FIG. 14, coins are fed through the bucket opening 140 into the interior where the coins are directed to the hopper dispenser 308. While the flow of the coins from the bucket may be controlled using the funnel assembly 132 to reduce the occurrence of coin jams and similar service issues, the hopper dispenser 308 or other internal components may periodically require maintenance, to address such service issues.

Figure 15:
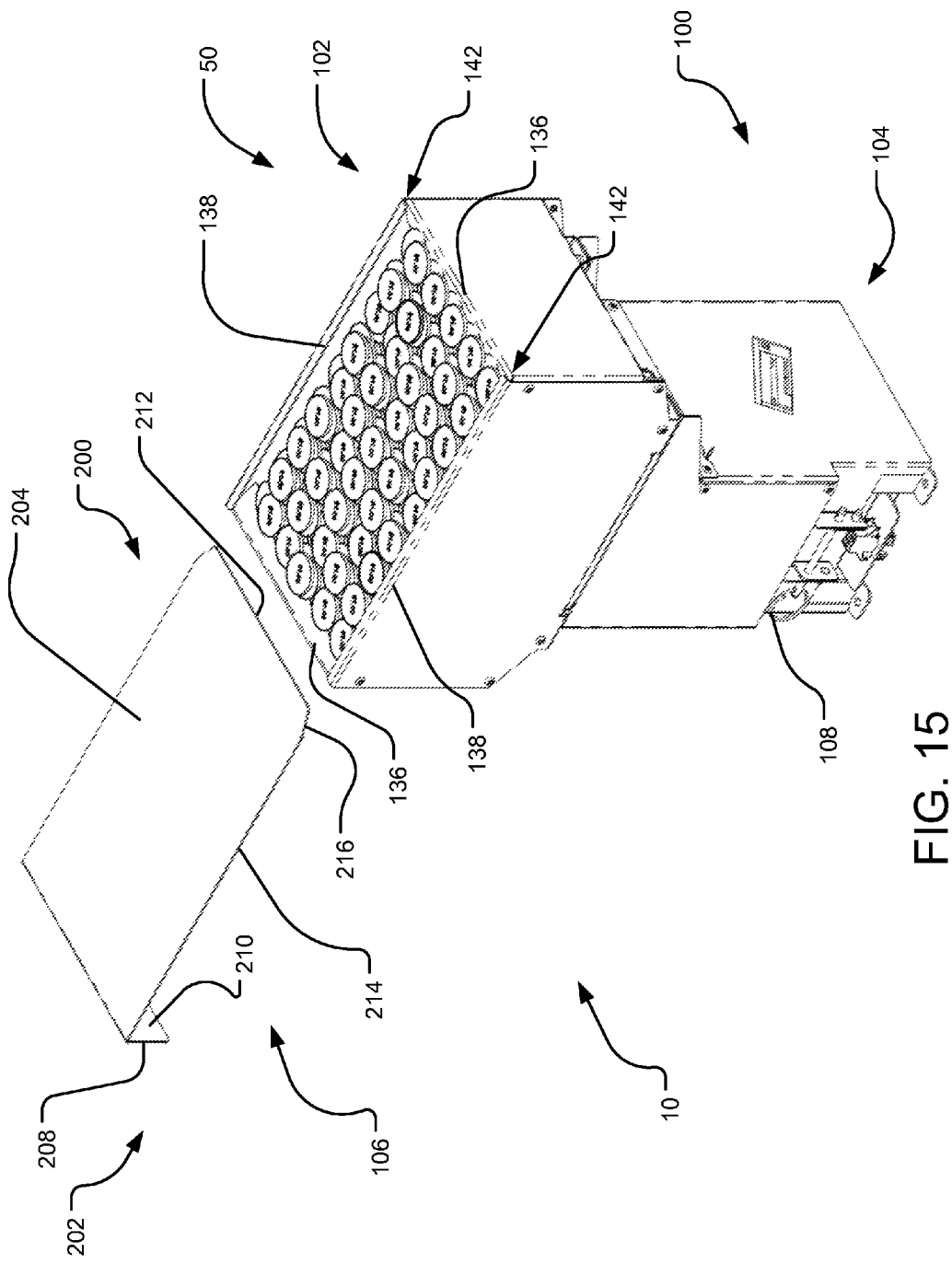
FIG. 15 shows the top plate positioned for insertion into the bucket assembly of the coin hopper.
Figure 16:
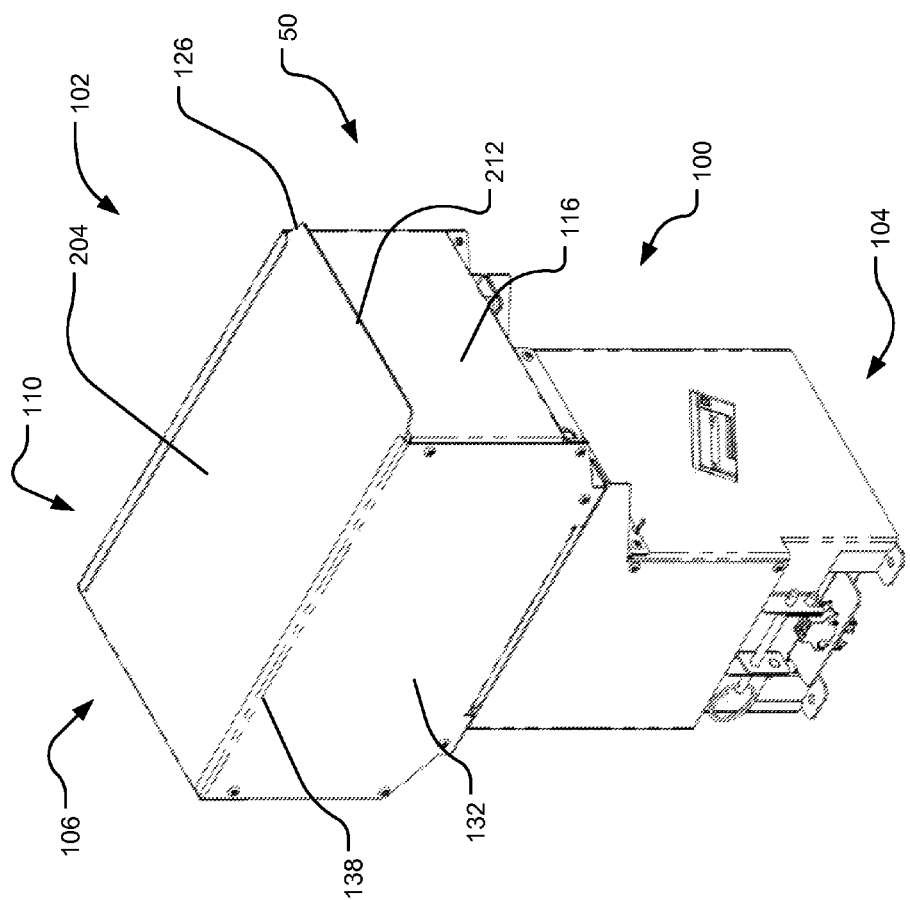
FIGS. 16-17 show perspective views of the top plate inserted into the bucket assembly sealing the coins inside.
Figure 17:
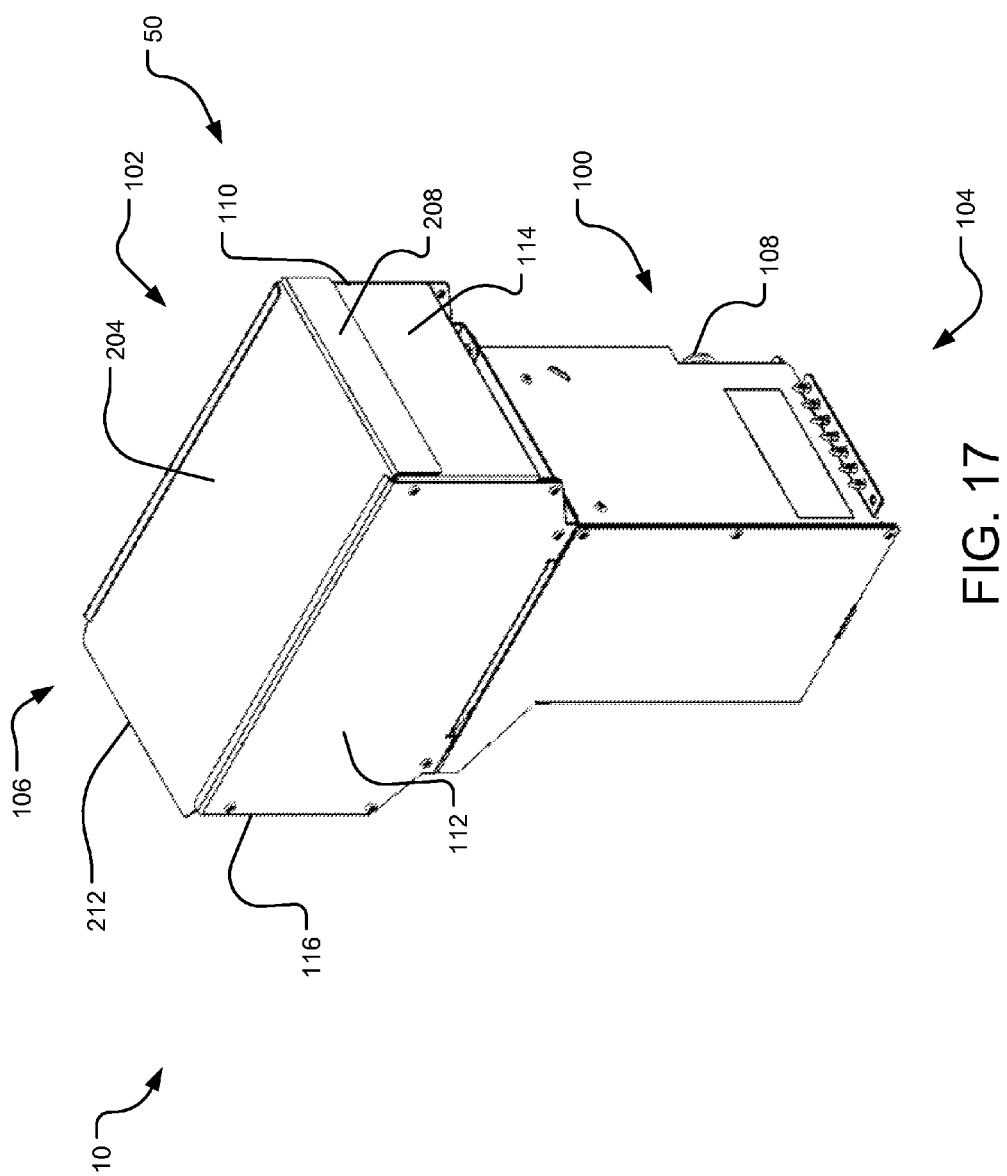
Figure 18:
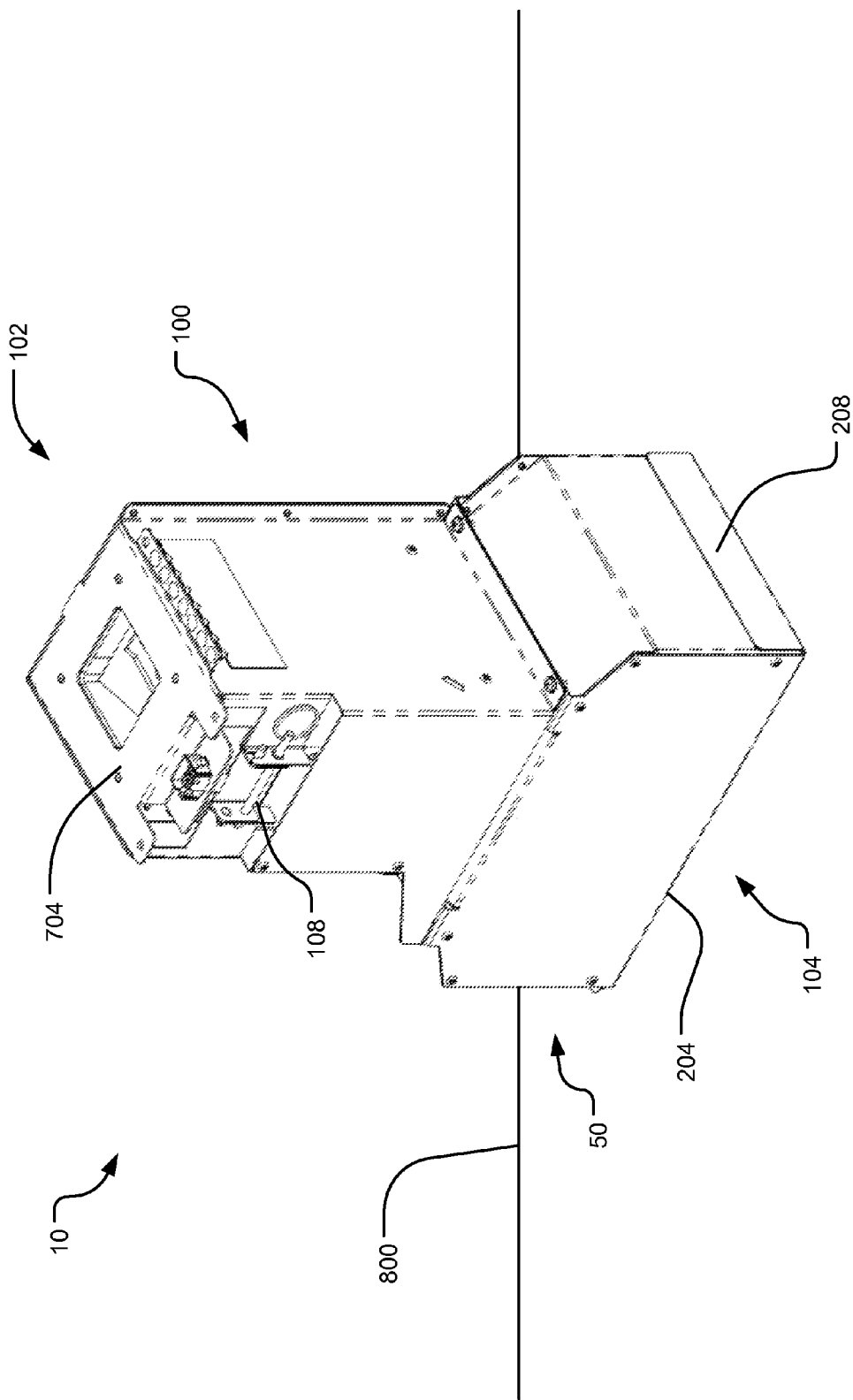
FIG. 18 illustrates the coin hopper positioned in an inverted orientation.

Rather than emptying the coin hopper 10, which is often burdensome and time consuming, the top plate 106 may engage the proximal end 102 of the coin hopper 10 to close the bucket opening 140 and seal the coins within the interior of the bucket assembly 50, as shown in FIGS. 15-17. In one implementation, the body 200 of the top plate 106 slides along the channels 142 of the bucket assembly 50 until the stopper 202 of the top plate 106 meets the back panel 114, as shown in FIG. 17. More specifically, in one implementation, the edge 212 of the body 200 is aligned with the end 136 of the back panel 114 and slid longitudinally with the side edges 214 of the body 200 moving within the channels 142 until the surface 210 of the stopper 202 meets the surface of the back panel 114, thereby sealing the coins within the interior of the bucket assembly 50. Once the surface 210 of the stopper 202 meets the surface of the back panel 114, the edge 212 may extend past the front panel 116 on the opposite end, as shown in FIG. 16. It will be appreciated that the top plate 106 may be inserted into the channel 142 from the other direction as well.

One of ordinary skill will understand that the top plate 106 may engage the bucket assembly 50 to close the bucket opening 140 and seal the coins within the interior in a variety of manners in addition or alternative to sliding the top plate 106 into the channels 142. For example, the top plate 106 may be mounted to the bucket assembly 50 with a hinge and rotate about an axis to close the bucket opening 140. As additional examples, the top plate 106 may engage the bucket assembly 50 to cover the bucket opening 140 using, without limitation, a snap-fit connection, a friction connection, corresponding engaging features (male/female connectors), a sliding connection, a rotating connection, a magnetic connection, and/or other connections or engaging features.

Figure 19:
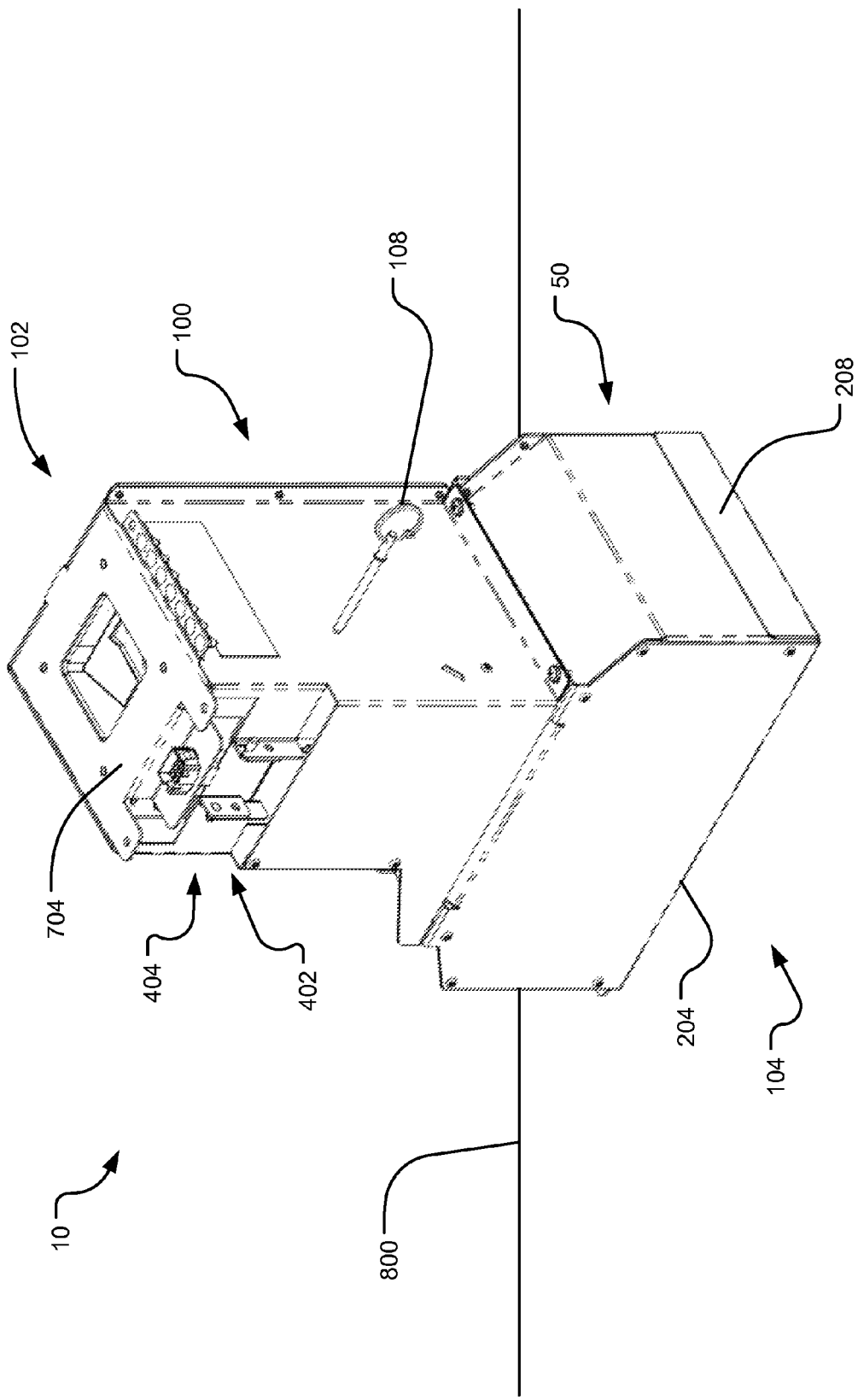
FIG. 19 is the same view as FIG. 18 with a release pin removed from the base assembly.
Figure 20:
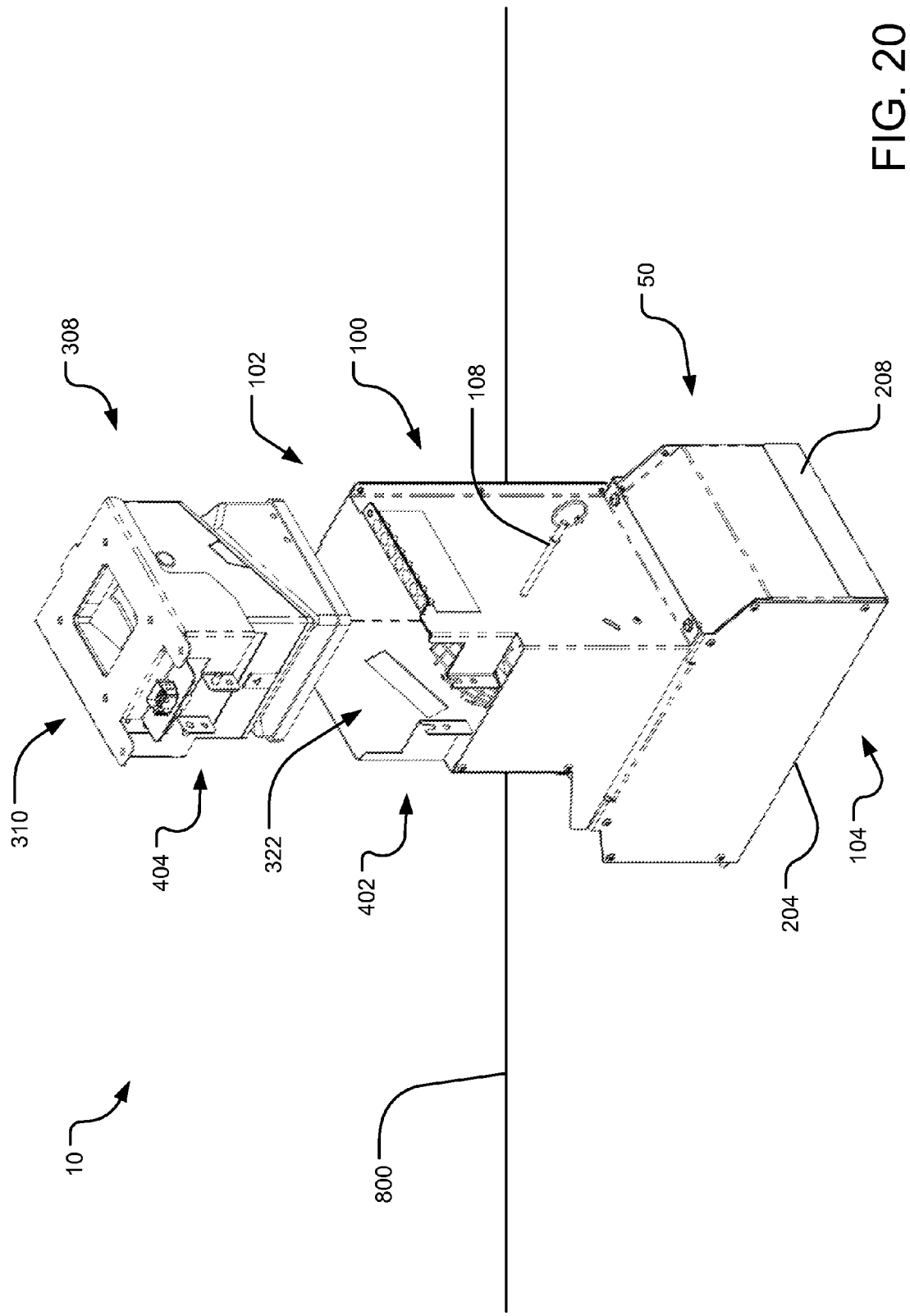
FIG. 20 shows the hopper dispenser being removed from the base assembly.
Figure 21:
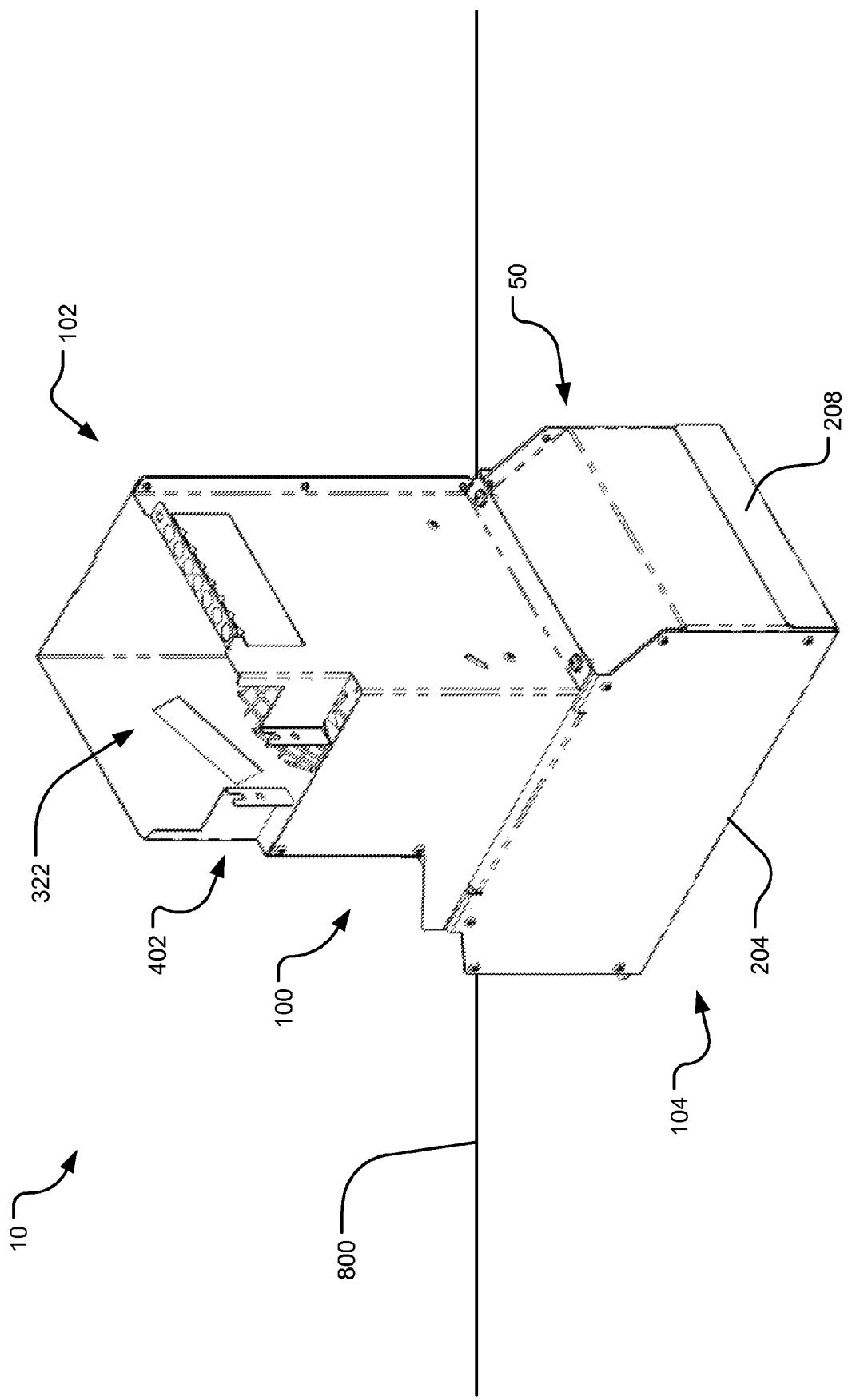
FIG. 21 shows the coin hopper with the hopper dispenser removed.
Figure 22:
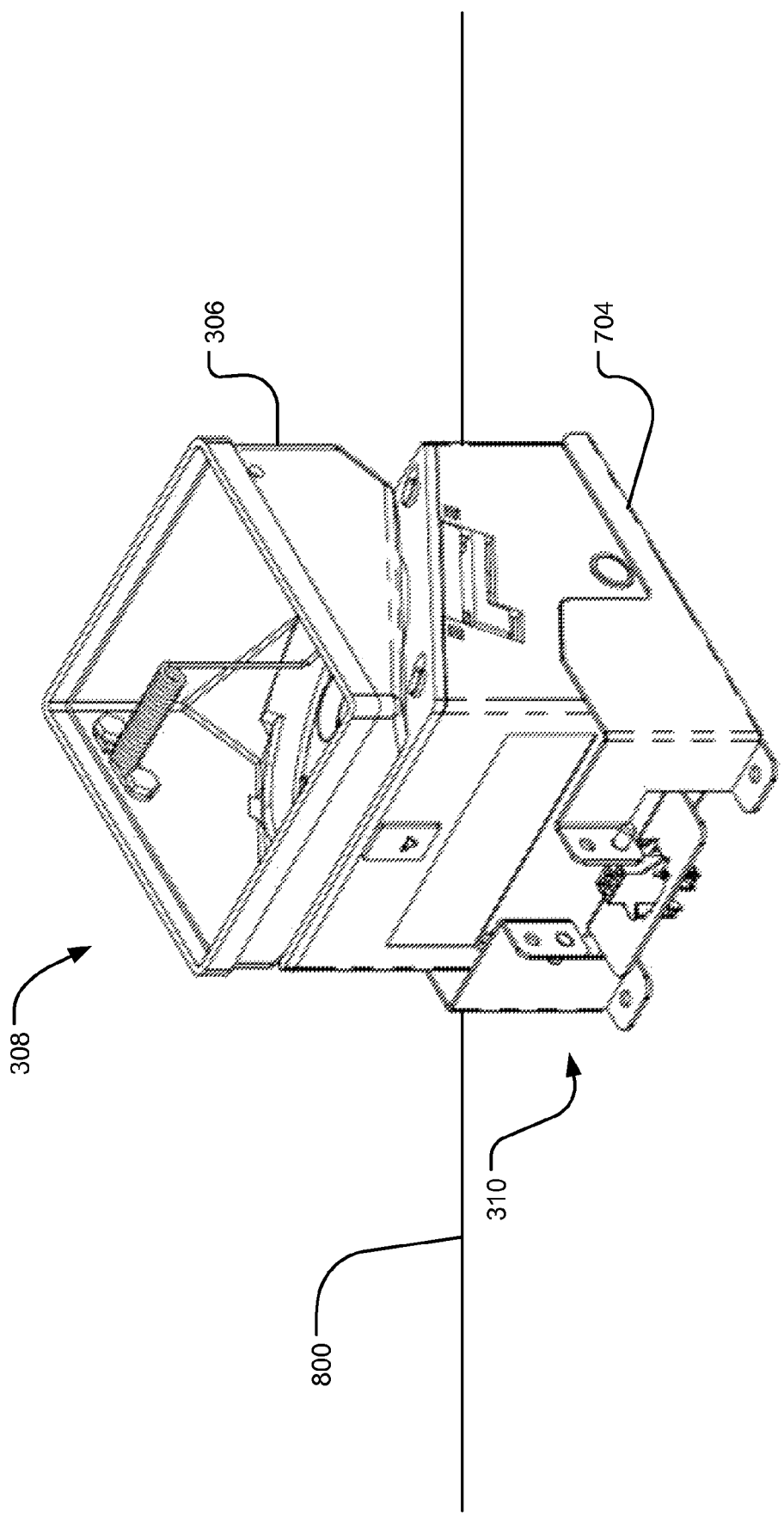
FIG. 22 illustrates the hopper dispenser positioned for maintenance.

Turning to FIGS. 18-21, in one implementation, the top plate 106 is configured to meet a target surface 800, such as a floor, work table, or the like to orient the coin hopper 10 for maintenance. As can be understood in FIG. 18, to access the hopper dispenser 308, in one implementation, the coin hopper 10 is positioned in an inverted orientation on the target surface 800, such that the distal end 104 is accessible and the proximal end 102 is disposed near the target surface 800. To release the hopper dispenser 308 from the base assembly 100 for maintenance, the release pin 108 is removed from the hopper base receiver 400 and the base assembly receiver 402, as shown in FIG. 19. The hopper dispenser 308 may then be removed from the interior 322 of the base assembly 100, as shown in FIGS. 20 and 21, and positioned on the target surface 800 for maintenance, as shown in FIG. 22.

Figure 23:
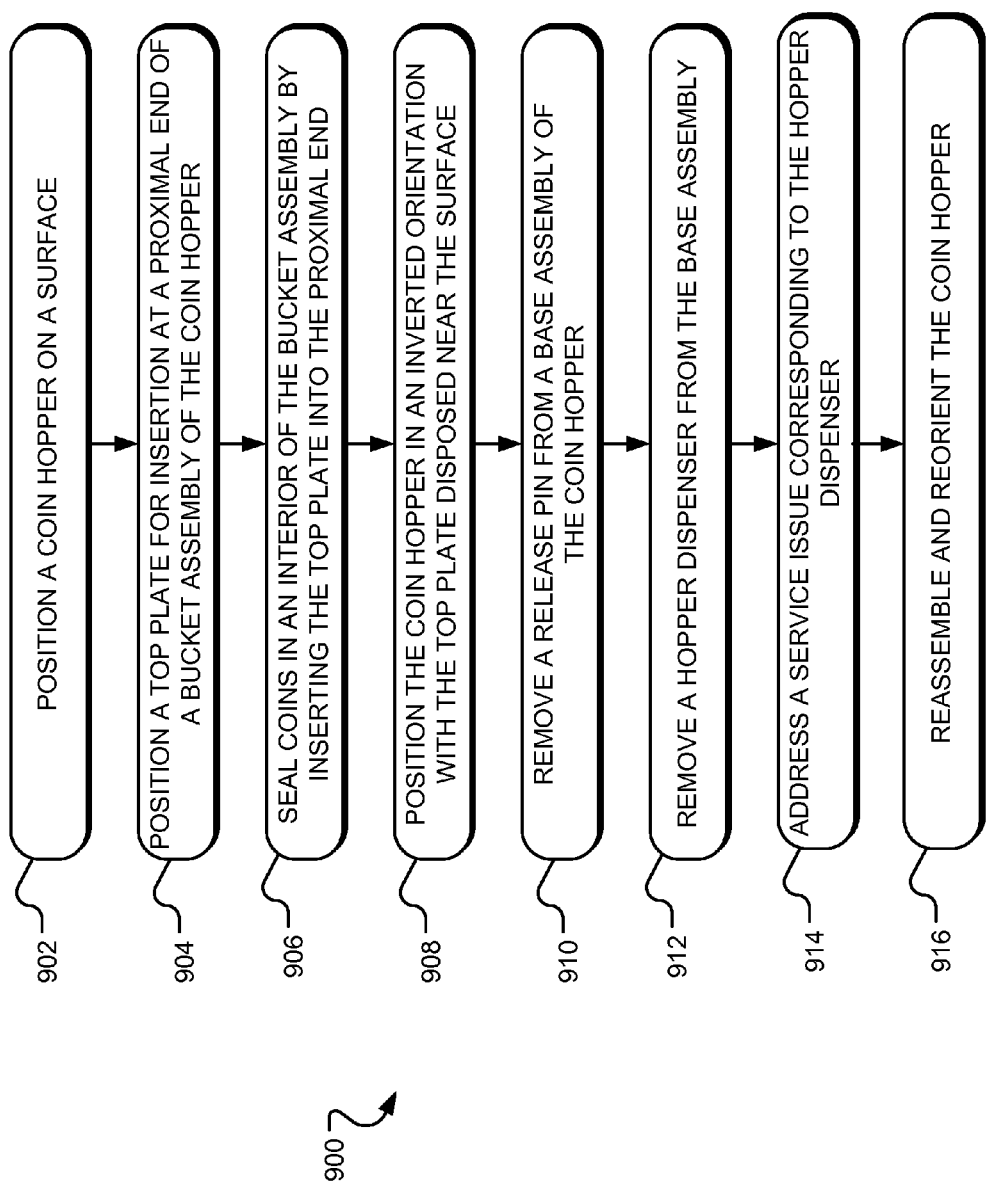
FIG. 23 is a flow chart illustrating example operations for facilitating coin hopper maintenance.

For a detailed description of example operations 900 for facilitating coin hopper maintenance, reference is made to FIG. 23. In one implementation, to perform maintenance, such as addressing a coin jam or other service issues, an operation 902 positions a coin hopper on a surface, which may be a floor, work table, or any other stable surface. An operation 904 positions a top plate for insertion at a proximal end of a bucket assembly of the coin hopper, and an operation 906 seals coins in an interior of the bucket assembly by inserting the top plate into the proximal end.

In one implementation, an operation 908 positions the coin hopper in an inverted orientation with the top plate disposed near the surface. An operation 910 removes a release pin from a base assembly of the coin hopper, and an operation 912 removes a hopper dispenser from the base assembly. An operation 914 addresses a service issue corresponding to the hopper dispenser. An operation 916 reassembles and reorients the coin hopper. In one implementation, the operation 916 comprises reversing the operations 902-912. Eliminating the need of conventional coin hoppers to remove the coins prior to performing maintenance significantly increases efficiency and reduces the effort exerted while servicing the coin hopper.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A coin hopper comprising:
   a bucket assembly having a proximal edge defining an opening through which one or more coins are receivable;
   a base assembly mounted to the bucket assembly, the base assembly disposed at a distal end and the bucket assembly disposed at a proximal end;
   at least one channel disposed at the proximal edge; and
   a top plate receivable into the at least one channel to seal the opening, the top plate adapted to contact a target surface positioning the bucket assembly in an inverted orientation.

2. The coin hopper of claim 1, wherein the bucket assembly is disposed at the distal end and the base assembly is disposed at the proximal end in the inverted orientation when the top plate contacts the target surface.

3. The coin hopper of claim 1, wherein an interior of the base assembly houses a hopper dispenser.

4. The coin hopper of claim 3, wherein the hopper dispenser is releaseable from the interior of the base assembly with a release pin.

5. The coin hopper of claim 4, wherein the release pin is removably engaged to a receiver and the hopper dispenser is releaseable by disengaging the release pin from the receiver.

6. The coin hopper of claim 5, wherein the receiver includes a base assembly receiver and a hopper base receiver.

7. The coin hopper of claim 1, wherein the proximal edge is formed by at least one end extending inwardly to form a lip.

8. The coin hopper of claim 1, wherein the at least one channel is formed by a proximal end extending towards a center of the bucket assembly and a side end extending toward the center in a direction transverse to the proximal end.

9. The coin hopper of claim 8, wherein the proximal end is disposed proximate to the side end.

10. A coin hopper comprising:
    a body extending longitudinally from a stopper to an edge and transversely between a pair of opposing side edges along a plane; and
    at least one surface forming the stopper, the at least one surface oriented at an angle relative to the plane, the body engagable to a bucket assembly to seal an opening to a bucket interior housing one or more coins, the bucket assembly disposed at a proximal end and mounted to a base assembly disposed at a distal end, the body adapted to contact a target surface positioning the bucket assembly in an inverted orientation.

11. The coin hopper of claim 10, wherein the angle is perpendicular.

12. The coin hopper of claim 10, wherein the body includes one or more planar surfaces.

13. The coin hopper of claim 10, wherein the at least one surface forming the stopper is planar.

14. A method for facilitating maintenance of a coin hopper, the method comprising:
    receiving a top plate in a bucket assembly of the coin hopper at a proximal end, the top plate sealing one or more coins in an interior of the bucket assembly;
    positioning the coin hopper in an inverted orientation by meeting a target surface with the top plate, the inverted orientation positioning the bucket assembly at a distal end near the target surface and a base assembly at the proximal end; and
    disengaging a hopper dispenser from the base assembly of the coin hopper.

15. The method of claim 14, wherein the top plate is received into at least one channel of the bucket assembly.

16. The method of claim 15, wherein the at least one channel is formed by a proximal end extending towards a center of the bucket assembly and a side end extending toward the center in a direction transverse to the proximal end.

17. The method of claim 14, wherein the hopper dispenser is disengaged from the base assembly of the coin hopper by removing a release pin from a receiver.

18. The method of claim 17, wherein the receiver includes a base assembly receiver and a hopper base receiver.

19. The method of claim 14, wherein the bucket assembly receives the top plate by sliding.

* * * * *